(12) United States Patent
Lee et al.

(10) Patent No.: US 12,361,775 B2
(45) Date of Patent: *Jul. 15, 2025

(54) ACCESS CONTROL DEVICE, ACCESS CONTROL SYSTEM AND ACCESS CONTROL METHOD USING THE SAME

(71) Applicant: MOCA SYSTEM INC., Seongnam-si (KR)

(72) Inventors: Jong Keun Lee, Seongnam-si (KR); Seong Bin Choi, Seongnam-si (KR)

(73) Assignee: MOCA SYSTEM INC., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/208,879

(22) Filed: Mar. 22, 2021

(65) Prior Publication Data

US 2021/0209879 A1 Jul. 8, 2021

Related U.S. Application Data

(63) Continuation of application No. 16/893,314, filed on Jun. 4, 2020, now Pat. No. 10,984,620.

(30) Foreign Application Priority Data

Jun. 5, 2019 (KR) ........................ 10-2019-0066684

(51) Int. Cl.
| | | |
|---|---|---|
| *G07C 9/00* | (2020.01) | |
| *G06F 21/32* | (2013.01) | |
| *G07C 9/27* | (2020.01) | |

(52) U.S. Cl.
CPC ......... *G07C 9/00563* (2013.01); *G06F 21/32* (2013.01); *G07C 9/00309* (2013.01);
(Continued)

(58) Field of Classification Search
CPC ......... G06F 21/31; G06F 21/32; G06Q 50/10; G06V 40/12; G07C 9/00; G07C 9/00031;
(Continued)

(56) References Cited

U.S. PATENT DOCUMENTS

| | | | | |
|---|---|---|---|---|
| 5,514,857 A | * | 5/1996 | Corless | .................... G07C 9/10 235/382 |
| 10,818,118 B2 | | 10/2020 | Sivalingam et al. | |

(Continued)

FOREIGN PATENT DOCUMENTS

| | | |
|---|---|---|
| JP | 2004-236166 A | 8/2004 |
| JP | 2011-107779 A | 6/2011 |

(Continued)

OTHER PUBLICATIONS

KR Office Action in Application No. 10-2019-0066684 dated Sep. 29, 2020.

(Continued)

*Primary Examiner* — Stephen R Burgdorf
(74) *Attorney, Agent, or Firm* — Maschoff Brennan

(57) ABSTRACT

The present specification relates to an access control device, an access control system and an access control method using the same. The present specification discloses the access control method performed by a user's terminal which performs the user's access authentication, the method comprising, detecting the access control device in the user's terminal, establishing a communication channel, receiving the identification information from the access control device through the communication channel, checking the target door of the user's access authentication the based on the received identification information and determining whether or not the user is allowed to access to the target door based on access right information prestored in the user's terminal, wherein the access right information includes at least one of (Continued)

registered user identification information, registered terminal identification information, registered access control device identification information, access schedule information, and validity period information of the access right information.

18 Claims, 17 Drawing Sheets

(52) U.S. Cl.
CPC ............ G07C 9/00571 (2013.01); G07C 9/27 (2020.01); *G07C 2209/08* (2013.01)

(58) Field of Classification Search
CPC ............ G07C 9/00111; G07C 9/00174; G07C 9/00309; G07C 9/00563; G07C 9/00571; G07C 9/00904; G07C 9/22; G07C 9/27; G07C 2009/00365; G07C 2209/08; H04L 63/0861; H04W 12/06; H04W 12/08
USPC ........................................................ 340/5.52
See application file for complete search history.

(56) References Cited

U.S. PATENT DOCUMENTS

| | | |
|---|---|---|
| 2004/0205189 A1 | 10/2004 | Sata et al. |
| 2009/0164680 A1 | 6/2009 | Stobbe et al. |
| 2013/0145420 A1 | 6/2013 | Ting et al. |
| 2017/0004296 A1 | 1/2017 | Toiyama |
| 2017/0011573 A1* | 1/2017 | Belhadia ............ G07C 9/00563 |
| 2017/0148243 A1 | 5/2017 | Shin et al. |
| 2017/0352214 A1 | 12/2017 | Maiwand et al. |
| 2018/0102009 A1 | 4/2018 | Belhadia et al. |
| 2018/0182191 A1 | 6/2018 | Wagstaff |
| 2018/0283046 A1 | 10/2018 | Uchida et al. |
| 2019/0139342 A1 | 5/2019 | Shin et al. |
| 2019/0236866 A1 | 8/2019 | Leonard et al. |
| 2019/0244459 A1* | 8/2019 | Horgan .................. G05B 17/02 |
| 2019/0266818 A1* | 8/2019 | Lee ..................... G07C 9/00571 |
| 2019/0319940 A1* | 10/2019 | Hamel .................. H04L 9/3271 |
| 2020/0053096 A1 | 2/2020 | Bendersky et al. |
| 2022/0335759 A1 | 10/2022 | Shin et al. |

FOREIGN PATENT DOCUMENTS

| | | | |
|---|---|---|---|
| JP | 2016-079645 A | | 5/2016 |
| JP | 2017-106296 A | | 6/2017 |
| JP | 2019-508912 A | | 3/2019 |
| KR | 10-0980807 B1 | | 9/2009 |
| KR | 10-2017-0071869 A | | 6/2017 |
| KR | 10-1838858 B1 | | 4/2018 |
| KR | 10-1960799 B1 | | 12/2018 |
| KR | 10-1945688 B1 | | 2/2019 |
| WO | WO2015/146178 A1 | | 4/2017 |

OTHER PUBLICATIONS

EP Search Report in Application No. 20178319.8 dated Oct. 13, 2020.

Japanese Office Action issued in corresponding application No. 2020-098960, mailed Jun. 6, 2023.

* cited by examiner

FIG. 7

| VALIDITY PERIOD | | |
|---|---|---|
| 5 HOURS | | |
| USER | A | ACCESS SCHEDULE |
| TERMINAL | a | |
| BIOMETRIC INFORMATION | a` | |
| ACCESS CONTROL DEVICE WITH ACCESS RIGHT | FIRST DOOR | 09:00~16:00 |
| | SECOND DOOR | 00:00~24:00 |
| | FOURTH DOOR | 09:00~18:00 |

FIG. 8

| VALIDITY PERIOD | | | | | | | | |
|---|---|---|---|---|---|---|---|---|
| 5 HOURS | | | | | | | | |
| FIRST DOOR | | | | SECOND DOOR | | | | |
| USER | TERMINAL | BIOMETRIC INFORMATION | ACCESS SCHEDULE | USER | TERMINAL | BIOMETRIC INFORMATION | ACCESS SCHEDULE |
| A | a | a` | 09:00~16:00 | A | a | a` | 00:00~24:00 |
| B | b | b` | 09:00~14:00 | C | c | c` | 09:00~18:00 |
| C | c | c` | 08:00~18:00 | D | d | d` | 08:00~19:00 |
| D | d | d` | 12:00~17:00 | E | e | e` | 17:00~20:00 |

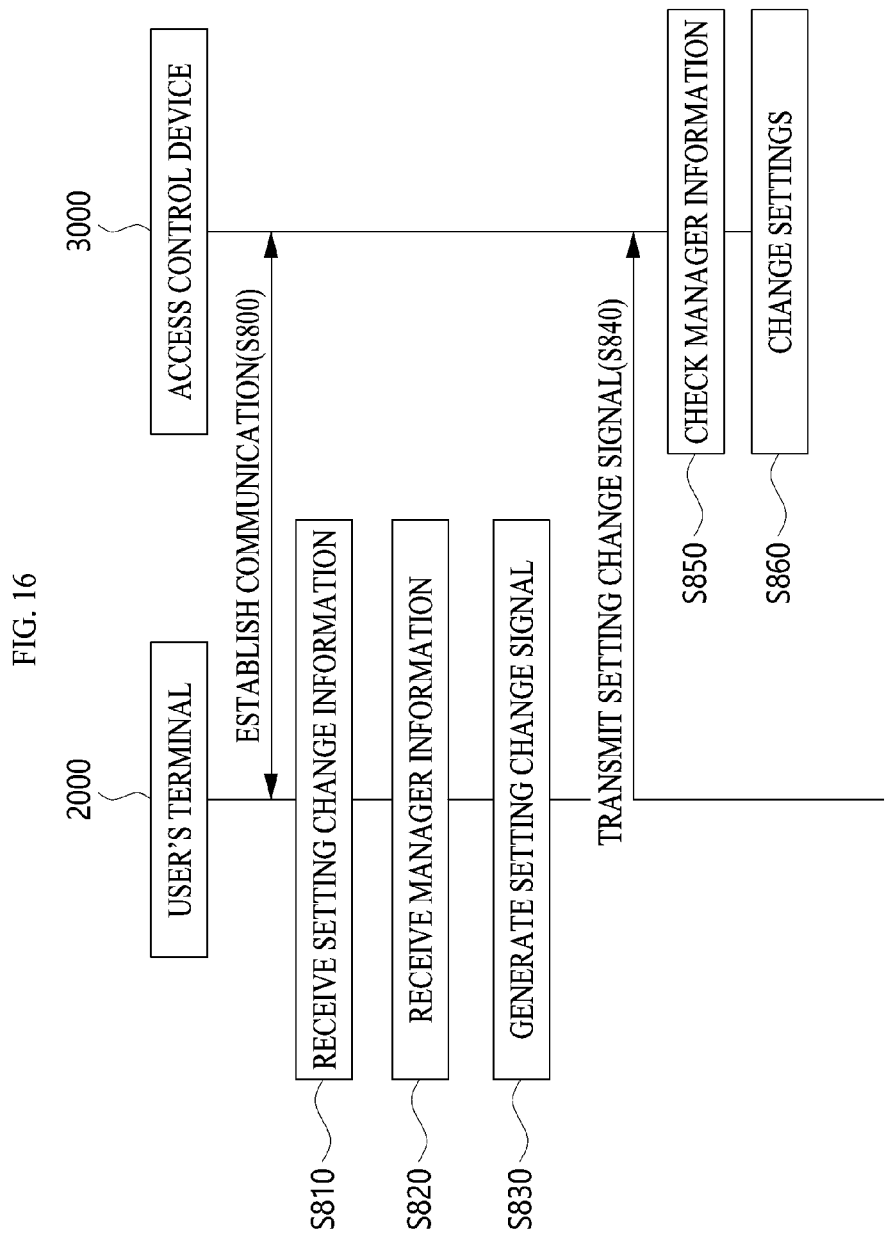

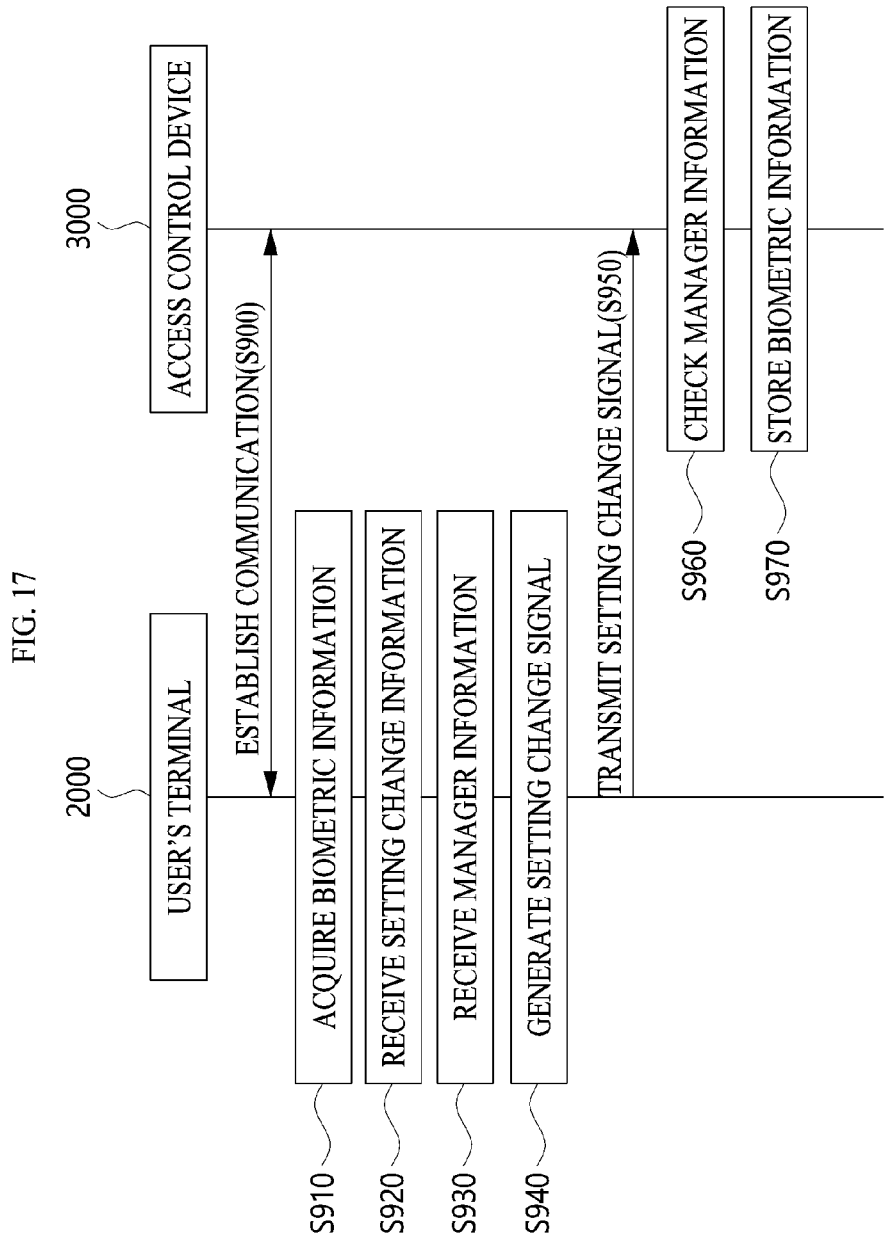

ACCESS CONTROL DEVICE, ACCESS CONTROL SYSTEM AND ACCESS CONTROL METHOD USING THE SAME

CROSS-REFERENCE TO RELATED APPLICATION

This application is a Continuation application of U.S. application Ser. No. 16/893,314, filed Jun. 4, 2020, which claims priority to and the benefit of Korean Patent Application No. 10-2019-0066684, filed on Jun. 5, 2019, the disclosure of which are incorporated herein by reference in their entirety.

BACKGROUND

1. Field of the Invention

The present disclosure relates to an access control device, access control system and access control method using the same.

2. Discussion of Related Art

An access control system is a system that recognizes and manages visitors who intend to access a specific space through a door. Access control systems are being widely used in typical offices and houses as well as in access-restricted facilities with high security.

A conventional authentication method used in such an access control system includes an authentication method using a magnetic card, a smart card, a non-contact wireless card, etc., and an authentication method using biometric information such as a fingerprint and an iris of a visitor.

In such a conventional authentication method, a visitor may access a door only after the visitor performs authentication through an authentication device installed near the door. As described above, authentication needs to be performed through a separate authentication device. Thus, when there are a plurality of visitors, it takes a long time to perform authentication. In addition, there is an inconvenience in that a user needs to always carry a separate authentication means such as a magnetic card, etc., and also there is a difficulty in that, when such an authentication means is lost, an unauthorized visitor who steals the separate authentication means can access the door.

Also, in the conventional authentication method, the authentication is performed only by means of a control server that collectively handles authentication devices installed near a door. Thus, it is impossible to access the door when communication between the control server and the authentication devices installed near the door is disconnected or when the control server is disabled.

Also, in the conventional authentication method, information for access authentication is stored in an authentication device, which may cause a problem with personal information security.

Recently, in order to solve these problems, efforts are being made to enhance user convenience and also to increase the security of an access control system.

SUMMARY OF THE INVENTION

The present disclosure is directed to providing an access control device, access control system and access control method using the same capable of increasing its security while increasing user convenience.

Technical problems intended to be solved are not limited to the aforementioned problems, and other technical problems that are not described herein will be clearly understood by those skilled in the art from the following description and the accompanying drawings.

According to an aspect of the present disclosure, there may be provided an access control method performed by a terminal of a user which performs access authentication of the user for entering a target door around the access control device corresponded to the target door, the method comprising, detecting the access control device in the terminal of the user, establishing a communication channel between the detected access control device and the terminal of the user, receiving the identification information from the access control device through the communication channel, checking the target door of the access authentication of the user the based on the received identification information and determining whether or not the user is allowed to access to the target door based on access right information prestored in the terminal of the user, wherein the access right information includes at least one of registered user identification information, registered terminal identification information, registered access control device identification information, access schedule information, and validity period information of the access right information.

Technical solutions of the present disclosure are not limited to the aforementioned solutions, and other solutions that are not described herein will be clearly understood by those skilled in the art from the following description and the accompanying drawings.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which:

FIG. 7 is an exemplary diagram of access right information according to an embodiment of the present disclosure;

FIG. 8 is an exemplary diagram of access right information according to an embodiment of the present disclosure;

FIG. 16 is a flowchart of a method for changing a setting of an access control device according to an embodiment of the present disclosure; and FIG. 17 is a flowchart of a method for storing biometric information acquired by a user's terminal in an access control device according to an embodiment of the present disclosure.

DETAILED DESCRIPTION OF EXEMPLARY EMBODIMENTS

Figure 1:
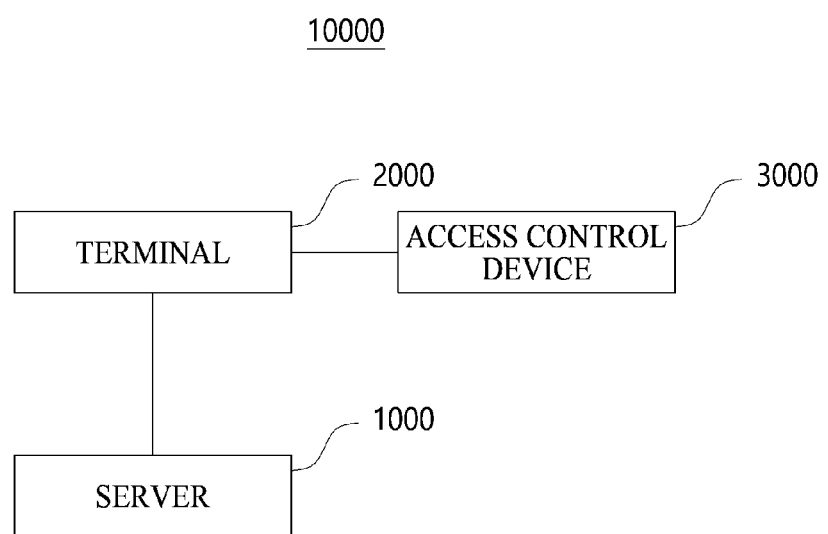
FIG. 1 is a block diagram of an access control system according to an embodiment of the present disclosure.

The above objects, features, and advantages of the present disclosure will become more apparent from the following detailed description taken in conjunction with the accompanying drawings. Since the present disclosure may be variously modified and have several exemplary embodiments, specific embodiments will be shown in the accompanying drawings and described in detail.

In the figures, the thickness of layers and regions is exaggerated for clarity. Also, when it is mentioned that an element or layer is "on" another element or layer, the element or layer may be formed directly on another element or layer, or a third element or layer may be interposed therebetween. Like reference numerals refer to like elements throughout the specification. Further, like reference numerals will be used to designate like elements within the same scope shown in the drawings of the embodiments.

Detailed descriptions about well-known functions or configurations associated with the present disclosure will be ruled out in order not to unnecessarily obscure subject matters of the present disclosure. It should also be noted that, although ordinal numbers (such as first and second) are used in the following description, they are used only to distinguish similar elements.

The suffixes "module" and "unit" for elements used in the following description are given or used interchangeably only for facilitation of preparing this specification, and thus they are not assigned a specific meaning or function.

According to an aspect of the present disclosure, there may be provided an access control method performed by a terminal of a user which performs access authentication of the user for entering a target door around the access control device corresponded to the target door, the method comprising, detecting the access control device in the terminal of the user, establishing a communication channel between the detected access control device and the terminal of the user, receiving the identification information from the access control device through the communication channel, checking the target door of the access authentication of the user the based on the received identification information, and determining whether or not the user is allowed to access to the target door based on access right information prestored in the terminal of the user, wherein the access right information includes at least one of registered user identification information, registered terminal identification information, registered access control device identification information, access schedule information, and validity period information of the access right information.

Also, the access control method may further comprise receiving biometric information of the user through the communication channel, wherein the biometric information of the user is inputted from the user on the access control device, and wherein the access right information further includes registered biometric information.

Also, the determining whether or not the user is allowed to access to the target door may include comparing the received biometric information of the user with the registered biometric information, and determining that the access authentication is successful when biometric information of the user is matched to one of the registered biometric information.

Also, the registered biometric information may be corresponded to at least one of registered user identification information, registered terminal identification information, registered access control device identification information, access schedule information, and validity period information of the access right information.

Also, the access right information may further include the access schedule information corresponded to the registered biometric information, and he determining that the access authentication is successful when the user's biometric information is matched to one of the registered biometric information may include comparing current time with the access schedule information related to the received biometric information of the user of the access right information, and determining that the access authentication has failed when the current time is not included in access schedule.

Also, the access right information may further include the registered terminal identification information corresponded to the registered biometric information, and wherein the determining that the access authentication is successful when biometric information of the user is matched to one of the registered biometric information may include comparing identification information of the terminal of the user with the registered terminal identification information related to the received biometric information of the user, and determining that the access authentication has failed when the identification information of the terminal of the user is not matched to one of the registered terminal identification information corresponded to the received biometric information of the user.

Also, the access right information may include the registered access control device identification information, and the determining whether or not the user is allowed to access to the target door may include comparing the received identification information with the registered access control device identification information of the access right information, and determining that the access authentication is successful when the received identification information is matched to one of the registered access control device identification information.

Also, the registered access control device identification information may be corresponded to at least one of the registered user identification information, the registered terminal identification information, the access schedule information, and the validity period information of the access right information.

Also, the access right information may further include the access schedule information corresponded to the registered access control device identification information, and the determining that the access authentication is successful when the received identification information is matched to one of the registered access control device identification information may include comparing current time with the access schedule information related to the received identification information of the access right information, and determining that the access authentication has failed when the current time is not included in access schedule.

Also, the access right information may further include the registered terminal identification information corresponded to the registered access control device identification information, and the determining that the access authentication is successful when the received identification information is matched to one of the registered access control device identification information may include comparing identification information of the terminal of the user with the registered terminal identification information related to the received identification information, and determining that the access authentication has failed when the identification information of the terminal of the user is not matched to one of the registered terminal identification information corresponded to the received identification information.

Also, the access right information may include the validity period information of the access right information, and when the access right information has expired, the step of the determining whether or not the user is allowed to access to the target door may be prevented.

Also, the access control method may further comprise when the access authentication is successful, generating a door opening signal, and transmitting the door opening signal to the access control device, the door opening signal forcing the access control device to perform a door opening operation.

Also, the access right information may be transmitted from a server which manages the access right information related to a plurality of doors.

Also, the access control method may further comprise when the step of the determining is completed, generating result information of the access authentication.

Also, the access control method may further comprise transmitting the result information of the access authentication to a server which manages the result information of the access authentication related to a plurality of users.

Also, the target door may be selected based on a distance between the detected access control device and the terminal of the user.

Also, the target door may be a door installed the detected access control having the distance between the detected access control device and the terminal of the user shorter than a specific distance.

According to an aspect of the present disclosure, there may be provided a non-transitory computer-readable recording medium having a program recorded thereon for executing the above method.

According to an aspect of the present disclosure, there may be provided an access control device around a target door corresponded to the access control device, the device comprising, a communication unit configured to establish a communication channel between the access control device and a terminal of a user and a control unit configured to transmit, via the communication unit, the identification information of the access control device for access authentication of the user performed by the terminal of the user based on access right information prestored in the terminal of the user for entering the target door to the terminal of the user through the communication channel, wherein the access right information includes at least one of registered user identification information, registered terminal identification information, registered access control device identification information, access schedule information, and validity period information of the access right information.

Also, the access control device may further comprise a biometric information input unit for receiving biometric information of the user, wherein the control unit may be configured to transmit, via the communication unit, the biometric information of the user to the terminal of the user through the communication channel, wherein the biometric information of the user is inputted from the user on the access control device, and wherein the access right information may further include registered biometric information.

According to an aspect of the present disclosure, there may be provided an access control method of an access system in which an access control device receives a door opening input from a user and transmits an access authentication request signal to a user terminal and in which the user terminal performs access authentication on the user on the basis of prestored access right information, the access control method including the access control device receiving a door opening input from the user; the access control device generating an access authentication request signal according to an input signal generated according to the input; the user terminal receiving the access authentication request signal from the access control device; and the user terminal performing access authentication on the user on the basis of the current time and the access right information, wherein the access right information includes access schedule information.

Also, the access control method may further include the user terminal communicating with a server and receiving a designated message from the server after the receiving of the access authentication request signal.

Also, the designated message may include an advertising message or a notification message.

Also, the designated message may be a message designated according to the current time among a plurality of messages.

Also, the performing of the access authentication may include checking whether the current time is included in the access schedule information and determining that the access authentication is successful when the current time is included in the access schedule information.

Also, the access control method may further include the user terminal acquiring identification information from the access control device. The access right information may further include registered access control device identification information, and the registered access control device identification information may be corresponded to the access schedule information. The performing of the access authentication may include checking whether the acquired identification information is included in the registered access control device identification information corresponded to the access schedule information and determining that the access authentication has failed when the acquired identification information is not included in the registered access control device identification information.

Also, the acquiring of the identification information of the access control device may include receiving the access authentication request signal including the identification information of the access control device.

Also, the access control method may further include generating the user terminal generating a door opening signal when the access authentication is successful, after the performing of the access authentication, and the door opening signal may force the access control device to perform a door opening operation.

Also, the access control method may further include the user terminal transmitting the door opening signal to the access control device.

Also, the access control method may further include receiving the access right information from the server.

Also, the access control method may further include requesting the access right information from the server before the receiving of the access right information transmitted by the server.

Also, the user terminal may communicate with the access control device through at least one of BLE, Bluetooth, NFC, and WiFi.

According to an aspect of the present disclosure, there may be provided a recording medium having a program recorded thereon for executing the above-described method.

According to an aspect of the present disclosure, there may be provided an access control device that transmits identification information for user access authentication to a user terminal that performs user access authentication on the basis of access right information, the access control device including a communication unit configured to communicate with the user terminal; and a control unit configured to control the communication unit to transmit identification information of the access control device to the user terminal when a signal for starting communication is received from the user terminal through the communication unit.

Also, the access control device may further include a biometric-information input unit configured to receive the user's biometric information, and the control unit may control the communication unit to transmit the user's biometric information received by the biometric-information input unit to the user terminal.

Also, the control unit may encrypt the biometric information received by the biometric-information input unit.

Also, the access control device may further include a power unit configured to provide power necessary for a door opening operation, and the control unit may control the power unit to perform the door opening operation when the door opening signal is received from the user terminal.

According to an aspect of the present disclosure, there may be provided an access control device that receives a door opening input from a user and transmits an access authentication request signal to a user terminal, the access control device including an input unit configured to receive a door opening input from the user; a communication unit configured to communicate with the user terminal; and a control unit configured to generate an access authentication request signal and control the communication unit to transmit the access authentication request signal to the user terminal when the door opening input is received through the input unit.

Also, the access control device may further include a power unit configured to provide power necessary for a door opening operation, and the control unit may control the power unit to perform the door opening operation when the door opening signal is received from the user terminal.

Also, the control unit may transmit the identification information of the access control device to the user terminal through the communication unit.

Also, the access authentication request signal may be a signal including the identification information of the access control device.

According to an aspect of the present disclosure, there may be provided a setting change method of a user terminal that generates a setting change signal on the basis of manager information and setting change information which are received from a user and transmits the generated setting change signal to an access control device so that the access control device can perform a setting change, the setting change method including detecting the access control device and establishing a communication with the access control device; receiving setting change information for a setting change to be performed by the access control device; receiving manager information to be transmitted to the access control device so that the manager information is compared to prestored manager information of the access control device; generating the setting change signal on the basis of the received setting change information; and transmitting the setting change information and the manager information to the access control device through wireless communication.

Also, the setting change may include at least one of a communication interface setting change of the access control device, a PIN setting change of the access control device, a setting change for at least one of a display unit of the access control device and a voice output unit of the access control device, a format change for a card recognized by the access control device, a firmware update of the access control device, and storage of biometric information in the access control device.

Also, the setting change may be the storage of the biometric information in the access control device, and the setting change method may further include acquiring biometric information to be stored in the access control device.

Also, the biometric information may include at least one of fingerprint information, iris information, vein information, face information, and voice information.

Also, the acquiring of the biometric information may include receiving the biometric information from the user.

Also, the acquiring of the biometric information may include receiving the biometric information from the server.

Also, the setting change method may further include transmitting the biometric information to the access control device.

Also, the transmitting of the biometric information to the access control device may include transmitting the setting change signal including the biometric information.

Also, the setting change method may further include encrypting the biometric information.

Also, the manager information may include a manager password.

Also, the transmitting of the manager information to the access control device may include transmitting the setting change signal including the manager information.

Also, the wireless communication may include one of BLE, Bluetooth, NFC, and WiFi.

Also, the setting change method may further include receiving result information for the setting change from the access control device.

According to an aspect of the present disclosure, there may be provided a setting change method of an access control device that receives a setting change signal from a user terminal and performs a setting change, the setting change method including establishing a communication with the user terminal; receiving a setting change signal generated by the user terminal and manager information received by the user terminal from the user terminal; determining whether the received manager information matches the prestored manager information; and performing the setting change according to the setting change signal when the received manager information matches the prestored manager information.

Also, the setting change may include at least one of a communication interface setting change of the access control device, a PIN setting change of the access control device, a setting change for at least one of a display unit of the access control device and a voice output unit of the access control device, a format change for a card recognized by the access control device, a firmware update of the access control device, and storage of biometric information in the access control device.

Also, the setting change may be the storage of the biometric information in the access control device, and the setting change method may further include receiving the biometric information from the user terminal.

Also, the receiving of the biometric information from the user terminal may include receiving the setting change signal including the biometric information.

Also, the setting change method may further include decrypting the biometric information when the biometric information is encrypted.

Also, the manager information may include a manager password.

Also, the receiving of the received manager information may include receiving the setting change signal including the received manager information.

Also, the wireless communication may include one of BLE, Bluetooth, NFC, and WiFi.

Also, the setting change method may further include transmitting result information for the setting change to the user terminal.

According to an aspect of the present disclosure, there may be provided a recording medium having a program recorded thereon for executing the above-described method.

According to an aspect of the present disclosure, there may be provided an access control device that receives, from a user terminal, manager information and a setting change signal which are generated by the user terminal and that performs a setting change when the received manager information matches prestored manager information, the access control device including a communication unit configured to communicate with the user terminal; a storage unit configured to store manager information; and a control unit configured to receive the setting change signal and the manager information received by the user terminal from the user terminal through the communication unit, check whether the received manager information matches prestored manager information, and perform a control such that the setting change is performed according to the setting change signal when the received manager information matches the prestored manager information.

Also, the setting change may include at least one of a communication interface setting change of the access control device, a PIN setting change of the access control device, a setting change for at least one of a display unit of the access control device and a voice output unit of the access control device, a format change for a card recognized by the access control device, a firmware update of the access control device, and storage of biometric information in the access control device.

Also, the setting change may be the storage of the biometric information in the access control device, and the control unit may receive the biometric information from the user terminal through the communication unit and may perform a control such that the biometric information is stored in the storage unit.

Also, the receiving of the biometric information from the user terminal may include receiving the setting change signal including the biometric information.

Also, when the biometric information received through the communication unit is encrypted, the control unit may decrypt the biometric information.

Also, the manager information may include a manager password.

Also, the receiving of the received manager information may include receiving the setting change signal including the received manager information.

Also, the communication unit may use a wireless communication scheme, which is one of BLE, Bluetooth, NFC, and WiFi.

Also, the control unit may transmit the result information for the setting change to the user terminal through the communication unit.

An access control system 10000 according to an embodiment of the present disclosure will be described below. The access control system may refer to a system that manages access such that only a person who has succeeded in access authentication through a user's terminal 2000 can pass through has an access right to pass through a zone where an access control device is installed in an environment in which the access control device is installed. The access control system may be used in an indoor environment such as a fitness center, an office, an institute, or the like, or may also be used in an outdoor environment in which there is a restricted area outside a building, such as a military base.

A door may block or allow passage through one zone. A door may include a door frame and a door leaf. A door frame may be a fixed element that defines a zone where passage is to be blocked or allowed. A door leaf is an element having a changing position due to an external force. Depending on the position, a place where passage is blocked or allowed may be changed. The change in position of the door leaf may have a comprehensive meaning including rotational movement as well as the movement of the entire door leaf. It will be appreciated that a door is not limited to the above-described examples.

1. System Configuration

FIG. 1 is a block diagram of an access control system 10000 according to an embodiment.

Referring to FIG. 1, the access control system 10000 may include a server 1000, a terminal 2000, and an access control device 3000.

The server 1000 may communicate with the user's terminal 2000 to exchange various information.

According to an embodiment, the server 1000 may provide information necessary for user access authentication to the user's terminal 2000. Also, the server 1000 may acquire access authentication result information from the user's terminal 2000.

The user's terminal 2000 may communicate with the access control device 3000 to exchange various information.

For example, the user's terminal 2000 may receive the information necessary for access authentication from the access control device 3000. Also, the user's terminal 2000 may transmit data necessary for a door opening request and/or a setting change request to the access control device 3000.

Also, the user's terminal 2000 may provide an application for performing some embodiments, which will be described below.

Also, the user's terminal 2000 may be implemented with, for example, a smartphone, a tablet, a notebook, a personal digital assistant (PDA), a wearable device, etc. Alternatively, the user's terminal 2000 may be implemented with a smart card, an integrated circuit (IC) card, a magnetic card, a radio frequency (RF) chip, or the like, which is capable of recording data.

The access control device 3000 may control the opening or closing of a door.

For example, the access control device 3000 may be installed in a door to control the locking or unlocking of the door. The access control device 3000 is not necessarily installed in a door and may be provided in various forms, depending on the selection. For example, the access control device 3000 may be installed on a wall adjacent to a door to provide or withdraw an obstacle to or from the door. Also, when the door is an automatic door, the access control device 3000 may change the location of a door leaf to open or close the door.

However, the block diagram shown in FIG. 1 is just an example for convenience of description, and the present disclosure is not limited thereto. According to some embodiments, any element may be added to the block diagram of FIG. 1, and the elements shown in FIG. 1 may be excluded or subdivided.

Figure 2:
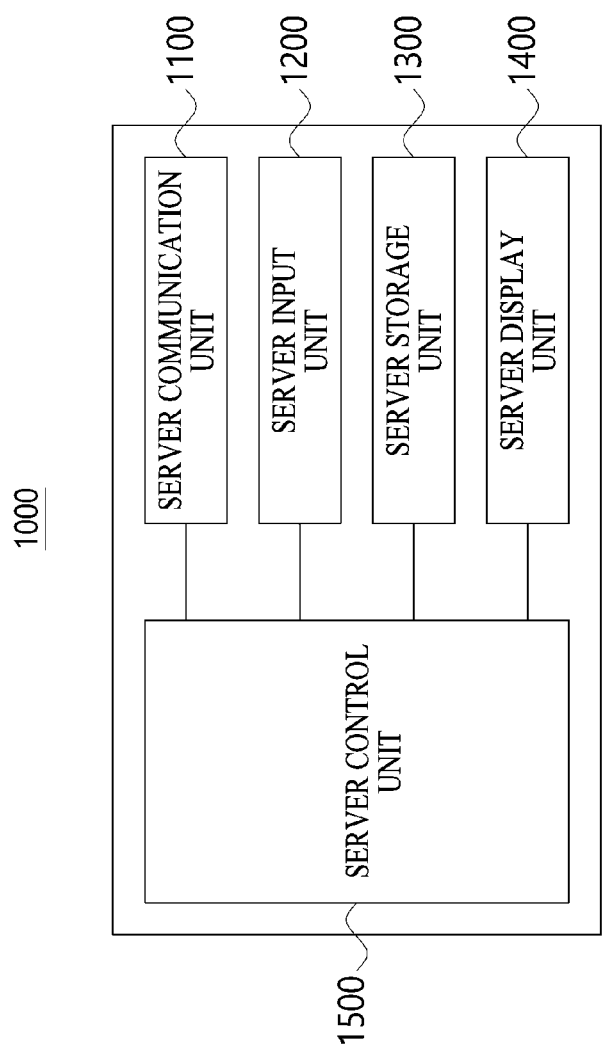
FIG. 2 is a block diagram of a server according to an embodiment of the present disclosure.

FIG. 2 is a block diagram of the server 1000 according to an embodiment.

Referring to FIG. 2, the server 1000 may include a server communication unit 1100, a server input unit 1200, a server storage unit 1300, a server display unit 1400, and a server control unit 1500.

The server communication unit 1100 may communicate with the user's terminal 2000. For example, the server communication unit 1100 may receive a request for the access right information from the user's terminal 2000. Also, the server communication unit 1100 may transmit the access right information to the user's terminal 2000. Also, the server communication unit 1100 may receive information regarding a user access authentication result from the user's terminal 2000. Also, when the user's terminal 2000 receives an access authentication request signal, the server communication unit 1100 may communicate with the user's terminal 2000 to transmit a pre-designated message to the user's terminal 2000.

As another example, the server communication unit 1100 may transmit biometric information to be stored in the access control device 3000 to the user's terminal 2000.

Also, the server communication unit 1100 may include mobile communication units such as Bluetooth low energy (BLE), Bluetooth, wireless local area network (WLAN), wireless fidelity (WiFi), WiFi Direct, near field communication (NFC), infrared data association (IrDA), ultra wide band (UWB), Zigbee, 3G, 4G, and 5G and other wired or wireless units capable of transmitting data through various communication standards.

The server input unit 1200 may acquire an electric signal corresponding to a user input. The server input unit 1200 may include a keypad, a keyboard, a switch, a button, and a touchscreen.

The server storage unit 1300 may store various kinds of data.

For example, the server storage unit 1300 may store access right information. Also, the server storage unit 1300 may store user access authentication result information acquired from the user's terminal 2000. Also, when the user's terminal 2000 receives an access authentication request signal, the server storage unit 1300 may store a designated message to be transmitted to the user's terminal 2000. Also, the server storage unit 1300 may store a program necessary for operation of the server 1000. Also, the server storage unit 1300 may store biometric information to be stored in the access control device 3000 through the user's terminal 2000.

The server storage unit 1300 may include at least one type of storage medium selected from among a flash memory-type memory, a hard disk-type memory, a multimedia card micro-type memory, a card-type memory (e.g., an SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disc. Also, the memory may store information temporarily, permanently, or semi-permanently and may be provided as a built-in-type or removable-type memory.

The server display unit 1400 may output visual information.

For example, the server display unit 1400 may be a liquid crystal display (LCD), an organic light-emitting diode (OLED) display, an active-matrix organic light-emitting diode (AMOLED) device, etc.

The server control unit 1500 may control each element of the server 1000 or may process and compute various kinds of information. For example, the server control unit 1500 may transmit access right information to the user's terminal 2000 through the server communication unit 1100. Also, when the user's terminal 2000 receives an access authentication request signal, the server control unit 1500 may communicate with the user's terminal 2000 to transmit a pre-designated message to the user's terminal 2000 through the server communication unit 1100. Also, the server control unit 1500 may transmit, to the user's terminal 2000, the biometric information to be stored in the access control device 3000 through the server communication unit 1100.

Also, among steps that will be described in the following methods, the server control unit 1500 may control operations for carrying out some steps that are performed by the server 1000 or may perform computations necessary to carry out the steps.

The server control unit 1500 may be implemented in software, hardware, or a combination thereof. For example, in hardware, the server control unit 1500 may be implemented with a field-programmable gate array (FPGA), an application-specific integrated circuit (ASIC), a semiconductor chip, and various other types of electronic circuits. As another example, in software, the server control unit 1500 may be implemented with logic programs or various kinds of computer languages which are executed according to the above-described hardware.

The server 1000 does not necessarily have to include all of the above-described elements, and some of the elements may be excluded depending on the selection. For example, when the server 1000 does not provide direct visual information, the server display unit 1400 may be excluded from the server 1000. Also, depending on the selection, an element for performing an additional function or operation may be selectively provided to the server 1000.

Figure 3:
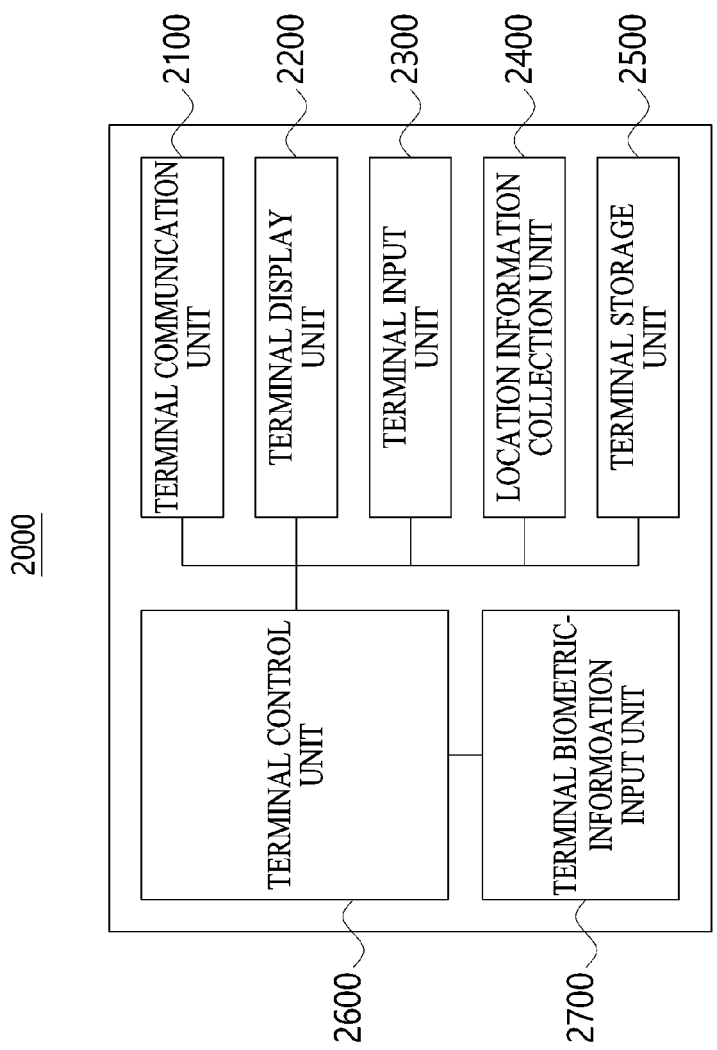
FIG. 3 is a block diagram of a terminal according to an embodiment of the present disclosure.

FIG. 3 is a block diagram of the terminal 2000 according to an embodiment.

Referring to FIG. 3, the terminal 2000 may include a terminal communication unit 2100, a terminal display unit 2200, a terminal input unit 2300, a terminal location information collection unit 2400, a terminal storage unit 2500, a terminal control unit 2600, and a terminal biometric-information input unit 2700.

The terminal communication unit 2100 may communicate with the server 1000.

For example, the terminal communication unit 2100 may request access right information from the server 1000. Also, the terminal communication unit 2100 may receive the access right information from the server 1000. Also, the terminal communication unit 2100 may transmit information regarding a user access authentication result to the server 1000. Also, when the terminal communication unit 2100 receives an access authentication request signal, the terminal communication unit 2100 may communicate with the user's terminal 2000 to receive a pre-designated message from the server 1000.

As another example, the terminal communication unit 2100 may receive biometric information to be stored in the access control device 3000 from the server 1000.

Also, the terminal communication unit 2100 may communicate with the access control device 3000.

For example, the terminal communication unit 2100 may receive biometric information from the access control device 3000. Also, the terminal communication unit 2100 may receive identification information of the access control device 3000 from the access control device 3000. Also, the terminal communication unit 2100 may receive an access authentication request signal from the access control device 3000. Also, the terminal communication unit 2100 may transmit a door opening signal to the access control device 3000.

As another example, the terminal communication unit 2100 may transmit a setting change signal to the access control device 3000. Also, the terminal communication unit 2100 may receive setting change result information from the access control device 3000.

The terminal communication unit 2100 may include mobile communication units such as BLE, Bluetooth, WLAN, WiFi, WiFi Direct, NFC, IrDA, UWB, Zigbee, 3G, 4G, and 5G and other wired or wireless units capable of transmitting data through various communication standards.

The terminal display unit 2200 may output various visual information.

For example, the terminal display unit 2200 may detect the access control device 3000 and may output the information when communication is established. Also, the terminal display unit 2200 may visually output a user access authentication result. Also, the terminal display unit 2200 may visually output a message received from the server 1000. Also, the terminal display unit 2200 may visually output a screen for inputting setting change information in order to change the settings of the access control device 3000.

The terminal display unit 2200 may be an LCD display, an OLED display, an AMOLED display, or the like. When the terminal display unit 2200 is provided as a touchscreen, the terminal display unit 2200 may function as the terminal input unit 2300. In this case, depending on the selection, a separate terminal input unit 2300 may not be provided, and a terminal input unit 2300 configured to perform limited functions such as a voltage adjustment function, a power button function, a home button function, etc. may be provided.

The terminal input unit 2300 may acquire a signal corresponding to a user input.

For example, the terminal input unit 2300 may receive an input for requesting access right information from the server 1000. Also, the terminal input unit 2300 may receive an input for requesting identification information or biometric information from the access control device 3000.

As another example, the terminal input unit 2300 may receive setting change information to change the settings of the access control device 3000. Also, the terminal input unit 2300 may receive manager information to be checked on whether the manager information matches manager information prestored in the access control device 3000.

The terminal input unit 2300 may be implemented with, for example, a keyboard, a keypad, a button, a jog dial, or a wheel. Also, the user input may be, for example, a button press, a touch, or a drag. When the terminal display unit 2200 is implemented with a touchscreen, the terminal display unit 2200 may serve as the terminal input unit 2300.

The terminal location information collection unit 2400 may acquire location information for the terminal 2000 to determine its location. For example, the terminal location information collection unit 2400 may be a unit configured to acquire coordinate information for performing location determination, such as a GPS unit.

The terminal storage unit 2500 may store various kinds of data.

For example, the terminal storage unit 2500 may store data necessary for operation of the terminal 2000. Also, the terminal storage unit 2500 may store the access right information.

The terminal storage unit 2500 may include at least one type of storage medium selected from among a flash memory-type memory, a hard disk-type memory, a multimedia card micro-type memory, a card-type memory (e.g., an SD or XD memory), a RAM, an SRAM, a ROM, an EEPROM, a PROM, a magnetic memory, a magnetic disk, and an optical disc. Also, the memory may store information temporarily, permanently, or semi-permanently and may be provided as a built-in-type or removable-type memory.

The terminal control unit 2600 may control each element of the terminal 2000 or may process and compute various kinds of information. Also, the terminal control unit 2600 may acquire signals from some elements included in the user's terminal 2000. Also, among steps that will be described in the following methods, the terminal control unit 2600 may control operations for carrying out some steps that are performed by the user's terminal 2000 or may perform computations necessary to carry out the steps.

The terminal control unit 2600 may be implemented in software, hardware, or a combination thereof. For example, in hardware, the terminal control unit 2600 may be implemented with an FPGA, an ASIC, a semiconductor chip, and various other types of electronic circuits. As another example, in software, the terminal control unit 2600 may be implemented with logic programs or various kinds of computer languages which are executed according to the above-described hardware.

The terminal biometric-information input unit 2700 may receive a user's biometric information. The biometric information may refer to at least one of the user's voice information, fingerprint information, iris information, face information, and vein information. The terminal biometric-information input unit 2700 may be implemented with at least one of a microphone through which the user's voice information is input, a screen scanner through which the user's fingerprint information is input, and a camera through which the user's iris information, face information, and vein information are input.

Figure 4:
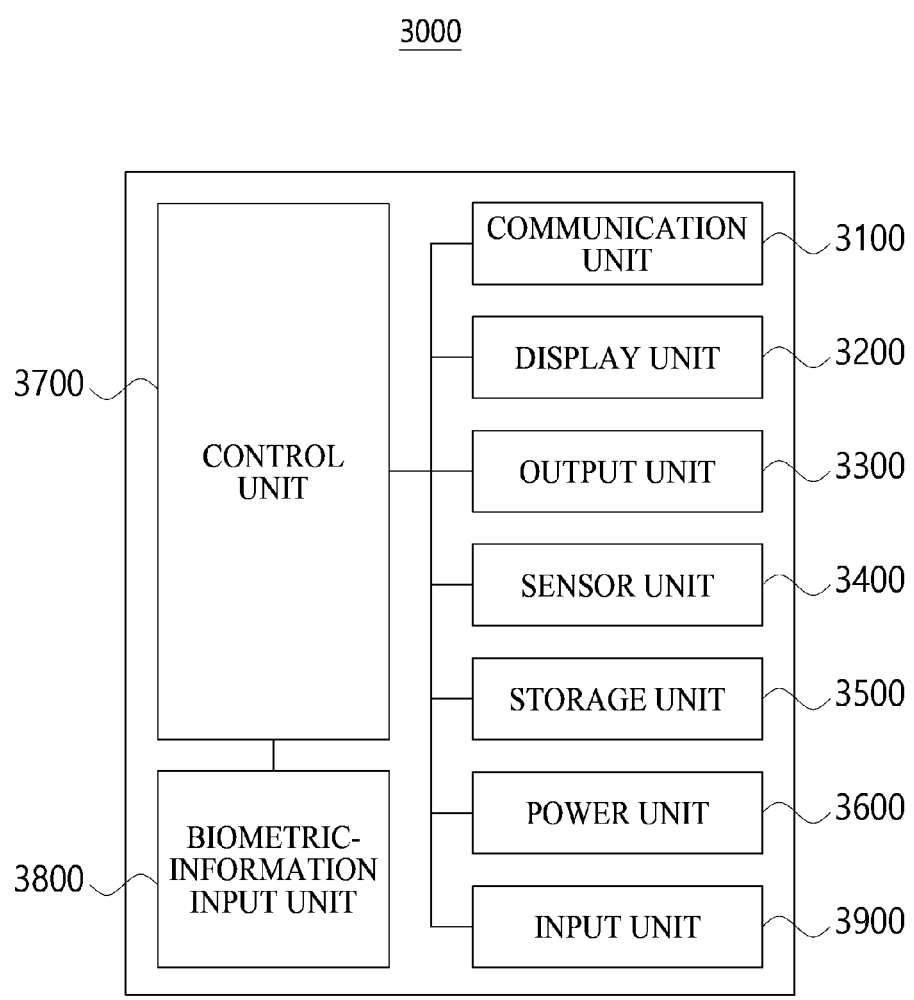
FIG. 4 is a block diagram of an access control device according to an embodiment of the present disclosure.

FIG. 4 is a block diagram of the access control device 3000 according to an embodiment.

Referring to FIG. 4, the access control device 3000 may include a communication unit 3100, a display unit 3200, a voice output unit 3300, a sensor unit 3400, a storage unit 3500, a power unit 3600, a control unit 3700, a biometric-information input unit 3800, and an input unit 3900.

The communication unit 3100 may communicate with the user's terminal 2000.

For example, the communication unit 3100 may transmit identification information of the access control device 3000 to the user's terminal 2000. Also, the communication unit 3100 may transmit biometric information received by the access control device 3000 to the user's terminal 2000. Also, the communication unit 3100 may transmit, to the user's terminal 2000, an access authentication request signal generated according to an input signal corresponding to a user's input for opening a door.

As another example, the communication unit 3100 may receive a setting change signal from the user's terminal 2000. Also, the communication unit 3100 may transmit result information obtained by performing a setting change to the user's terminal 2000.

The communication unit 3100 may mainly perform communications according to wireless communication standards, but may include mobile communication units such as BLE, Bluetooth, WLAN, WiFi, WiFi Direct, NFC, IrDA, UWB, Zigbee, 3G, 4G, and 5G and other wired or wireless units capable of transmitting data through various communication standards.

The display unit 3200 may output information to be visually provided to the user.

For example, when a door opening signal is received, the display unit 3200 may output information indicating the reception as visual information. Also, when a setting change signal is received, the display unit 3200 may output information indicating the reception as visual information.

The display unit 3200 may be an LCD display, an OLED display, an AMOLED display, or the like. When the display unit 3200 includes a touch panel, the display unit 3200 may operate as a touch input-based input device.

The voice output unit 3300 may output information to be auditorily provided to the user.

For example, when a door opening signal is received, the display unit 3200 may output information indicating the reception as auditory information. Also, when a setting change signal is received, the display unit 3200 may output information indicating the reception as auditory information.

The voice output unit 3300 may be a speaker, a buzzer, or the like, which outputs a sound.

The sensor unit 3400 may acquire an external environment signal required for the access control device 3000. For example, the sensor unit 3400 may acquire a signal regarding a distance from a user, an object, or the like. As another example, the sensor unit 3400 may acquire a signal necessary to determine the location of a door leaf.

Various kinds of information may be stored in the storage unit 3500.

For example, the storage unit 3500 may store a program for performing a control operation of the control unit 3700 and may store data received from the outside, data generated by the control unit 3700, etc. Also, the storage unit 3500 may store manager information to be checked on whether the manager information matches manager information received by the user's terminal 2000. Also, the storage unit 3500 may store biometric information received from the user's terminal 2000.

The storage unit 3500 may include at least one type of storage medium selected from among a flash memory-type memory, a hard disk-type memory, a multimedia card micro-type memory, a card-type memory (e.g., an SD or XD memory), a RAM, an SRAM, a ROM, an EEPROM, a PROM, a magnetic memory, a magnetic disk, and an optical disc. Also, the memory may store information temporarily, permanently, or semi-permanently and may be provided as a built-in-type or removable-type memory.

The power unit 3600 may provide power necessary to lock or unlock the door leaf. Also, when the door is implemented as an automatic door, the power unit 3600 may provide power necessary to open or close the door leaf.

The power unit 3600 may be provided as a motor, a solenoid, or an actuator.

When the power unit 3600 provides power necessary to lock or unlock the door leaf, the power unit 3600 may provide power so that a locking unit is maintained and/or changed from a locked state to an unlocked state. The locking unit may be provided as, for example, a deadbolt, a latch bolt, or a combination thereof. Also, the locking unit is not limited to the deadbolt and latch bolt that have been described as an example, and typical locking units may be utilized.

The control unit 3700 may control each element of the access control device 3000 or may process and compute various kinds of information. Also, the control unit 3700 may acquire signals from some elements included in the access control device 3000. Also, among steps that will be described in the following methods, the control unit 3700 may control operations for carrying out some steps that are performed by the access control device 3000 or may perform calculations necessary to carry out the steps.

The control unit 3700 may be implemented in software, hardware, or a combination thereof. For example, in hardware, the control unit 3700 may be implemented with an FPGA, an ASIC, a semiconductor chip, and various other types of electronic circuits. As another example, in software, the control unit 3700 may be implemented with logic programs or various kinds of computer languages which are executed according to the above-described hardware.

The biometric-information input unit 3800 may receive a user's biometric information.

For example, the biometric-information input unit 3800 may receive at least one of the user's voice information, fingerprint information, iris information, face information, and vein information.

The biometric-information input unit 3800 may be implemented with at least one of a microphone through which the user's voice information is input, a screen scanner through which the user's fingerprint information is input, and a camera through which the user's iris information, face information, and vein information are input.

The input unit 3900 may receive various inputs.

For example, the input unit 3900 may receive a door opening input from the user and may drive the power unit 3600 to open the door. Also, the input unit 3900 may receive the door opening input from the user and then may enable the access control device 3000 to transmit an access authentication request signal to the user's terminal 2000.

For example, the input unit 3900 may be implemented as a keyboard, a keypad, a button, a switch, a jog dial, or a wheel. Also, the user input may be, for example, a switch press, a button press, a touch, or a drag. When the display unit 3200 is implemented with a touchscreen, the display unit 3200 may serve as the input unit 3900.

The access control device 3000 according to an embodiment of the present disclosure does not necessarily have to include all of the above elements, and some of the elements may be excluded depending on the selection.

The access control system 10000 according to an embodiment of the present disclosure may be implemented in a form including at least one access control device 3000. As an example, the access control system 10000 may include one access control device 3000 including a communication unit 3100 and a control unit 3700. As a specific example, the access control device 3000 may receive information acquired from the terminal 2000 through the communication unit 3100, which functions as a reader, may analyze the acquired information through the control unit 3700, which functions as a controller, and may perform a function of transmitting a signal for unlocking a door locking device. Also, the access control device 3000 may perform a function of controlling operations such as door access control, time and attendance management, and system mode changes in addition to the function of transmitting the signal for unlocking a door locking device.

As another example, the access control system 10000 may include a first access control device 3000 including at least a communication unit 3100 and a second access control device 3000 including at least a control unit 3700. As a specific example, the first access control device 3000 may receive information acquired from the terminal 2000 through the communication unit 3100, which functions as a reader, and may transmit the acquired information to the second access control device 3000 through the communication unit 3100 connected to the second access control device 3000 in a wired or wireless communication manner. In this case, when the second access control device 3000 receives the information from the first access control device 3000, the second access control device 3000 may perform a function of transmitting a signal for unlocking a door locking device on the basis of the information received through the control unit 3700, which functions as a controller. Also, the second access control device 3000 may perform a function of controlling operations such as door access control, time and attendance management, and system mode change in addition to the function of transmitting the signal for unlocking a door locking device.

Also, depending on the selection, an element for performing an additional function or operation may be provided to the access control device 3000.

The access control system 10000 associated with various embodiments and the elements, operations, terms, and the like included in the access control system 10000 have been described above. The above-described access control system 10000 and the elements, operations, terms, and the like included in the access control system 10000 may be applied to various methods and embodiments which will be described below. However, it should be noted that the following access control system 10000 does not necessarily have to be configured to have the above-described elements and functions and may be applied even to an access control system having a different configuration from the above-described access control system 10000.

2. Control of Access Control Device Using User's Terminal

Figure 5:
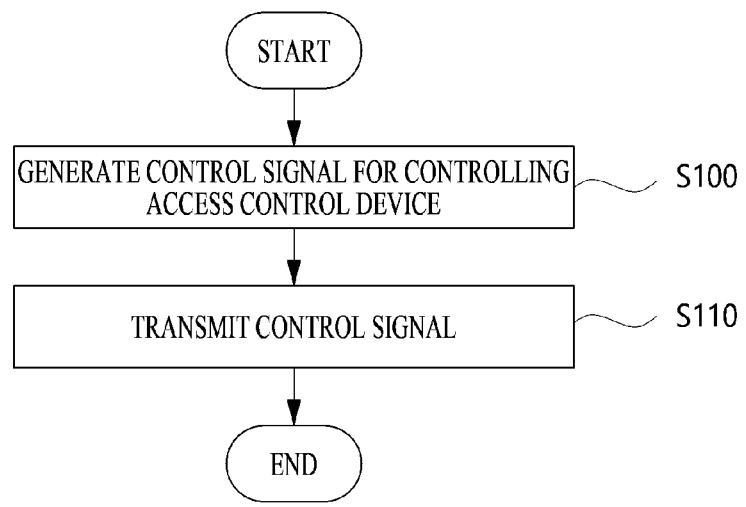
FIG. 5 is a flowchart of a method for controlling an access control device using a user's terminal according to an embodiment of the present disclosure.

FIG. 5 is a flowchart of a method for controlling an access control device 3000 using a user's terminal 2000 according to an embodiment of the present disclosure.

Referring to FIG. 5, the method for controlling an access control device 3000 using the user's terminal 2000 may include causing the user's terminal 2000 to generate a control signal for controlling the access control device 3000 (S100) and causing the user's terminal 2000 to transmit the control signal to the access control device 3000 (S110).

According to some embodiments, the step of the user's terminal 2000 generating a control signal for controlling the access control device 3000 (S100) may be performed.

The user's terminal 2000 may perform various operations in order to control the access control device 3000 and may generate a control signal to be transmitted to the access control device 3000. The control signal may be for opening a door or may be for changing settings of the access control device 3000.

For example, the user's terminal 2000 may perform user access authentication in order to control the access control device 3000 to open a door. When the access authentication is successful, the user's terminal 2000 may generate a door opening signal to be transmitted to the access control device 3000. The access control device 3000 may receive the door opening signal and open the door according to the door opening signal.

As another example, in order to control the access control device 3000 to change settings, the user's terminal 2000 may receive setting change information for the access control device 3000 and generate a setting change signal for the access control device 3000 on the basis of the setting change information. The access control device 3000 may receive the setting change signal and change the settings according to the setting change signal.

According to some embodiments, the step of the user's terminal 2000 transmitting a control signal to the access control device 3000 (S110) may be performed.

In order to control the access control device 3000, the user's terminal 2000 may transmit the control signal to the access control device 3000. For example, the user's terminal 2000 may transmit a door opening signal to the access control device 3000 in order to open a door. When the door opening signal is received, the access control device 3000 may open the door. As another example, the user's terminal 2000 may transmit a setting change signal to the access control device 3000 in order to change the settings of the access control device 3000. When the setting change signal is received, the access control device 3000 may perform a setting change.

The above-described control of the access control device 3000 using the user's terminal 2000 is just an example for convenience of description. Therefore, the present disclosure is not limited thereto, and a typical control of the access control device 3000 using the user's terminal 2000 may be utilized.

3. Access Control Method

A conventional access control system includes an authentication server for access control and an access control device. When a user requests permission for access, the authentication server for access control and the access control device are systematically associated with each other to determine whether to permit the access.

Such a conventional system may determine whether to permit access only when the authentication server for access control and the access control device remain communicable and also perform their respective roles. Accordingly, when the authentication server for access control is disabled or when a problem arises in communication between the authentication server for access control and the access control device, a user's access cannot be permitted. Also, the conventional system is vulnerable to security threats because access authentication information may be stored in the access control device.

A method of performing access authentication in the user's terminal 2000 will be described below with reference to FIGS. 6, 7, and 8.

Figure 6:
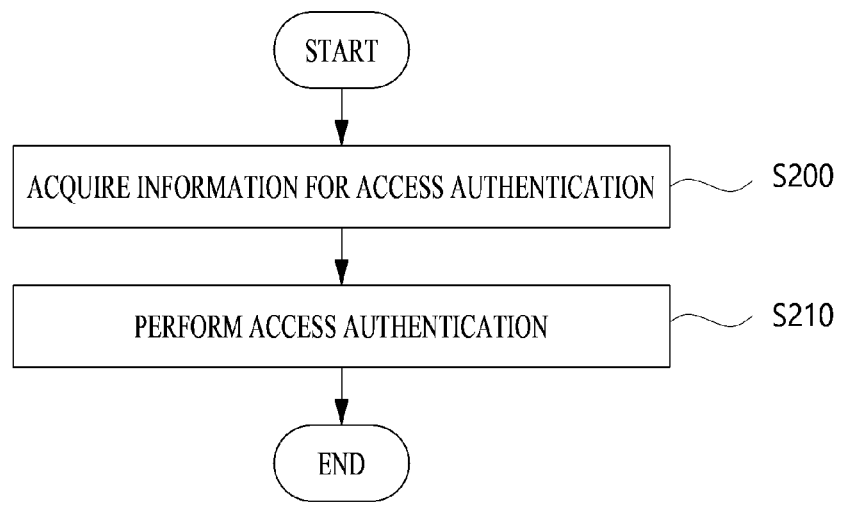
FIG. 6 is a flowchart of a method for performing access authentication in a user's terminal according to an embodiment of the present disclosure.

FIG. 6 is a flowchart of a method for performing access authentication in a user's terminal 2000 according to an embodiment of the present disclosure.

The method of the user's terminal 2000 performing access authentication may include acquiring access authentication information (S200) and performing access authentication (S210).

The user's terminal 2000 may acquire information to perform user access authentication (S200).

The user's terminal 2000 may acquire information for performing user access authentication from the server 1000 and the access control device 3000. For example, the user's terminal 2000 may acquire access right information from the server 1000. Also, the user's terminal 2000 may acquire, from the access control device 3000, identification information of the access control device 3000 and biometric information received from a user.

The user's terminal 2000 may perform access authentication on the user (S210).

The access authentication may be to determine whether the user has an access right. Therefore, successful access authentication may be a determination that the user has an access right, and failed access authentication may be a determination that the user has no access right.

The user's terminal 2000 may perform user access authentication in various ways on the basis of prestored access right information.

The identification information may be information for identifying a specific device among a plurality of devices. For example, the identification information may include at least one of a device ID, a universal unique identifier (UUID), a unique identifier (UID), an IP address, a MAC address, a CPU (MCU) serial number or HDD serial number, and a communication number of a terminal.

The access right information is information that is used by the user's terminal 2000 to perform user access authentication according to whether the user has an access right. The access right information may include at least one of registered user identification information, registered biometric information, registered terminal identification information, registered access control device identification information, access schedule information, and validity period information, which may be corresponded to each other. The access right information may be registered in the server 1000 and managed by a manager. The user's terminal 2000 may acquire the access right information from the server 1000 and store the acquired access right information before performing access authentication. Also, the access right information may be stored in the user's terminal 2000. However, when the access right information has expired or is not stored, the user's terminal 2000 may receive the access right information from the server 1000.

A method of performing user access authentication will be described below with reference to FIGS. 7 and 8.

FIGS. 7 and 8 are exemplary diagrams of access right information according to an embodiment of the present disclosure. However, FIGS. 7 and 8 are just examples for convenience of description, and the access right information is not limited thereto. Depending on the selection, some information may be excluded therefrom, or various additional information may be added thereto.

The user's terminal 2000 may check a target door of the access authentication of the user based on received identification information from the access control device 3000.

The user's terminal 2000 may perform user access authentication by comparing the access right information to the identification information of the access control device 3000.

In detail, the access right information includes registered access control device identification information. The user's terminal 2000 may check whether the identification information acquired from the access control device 3000 is included in the access right information, and may determine that the access authentication is successful when the identification information of the access control device 3000 is included in the access right information. Also, the user's terminal 2000 may check whether the identification information acquired from the access control device 3000 is included in the access right information, and may determine that the access authentication has failed when the identification information of the access control device 3000 is not included in the access right information.

Also, when the identification information of the access control device 3000 is included in the registered access control device identification information corresponded to other information in the access right information, the user's terminal 2000 may determine that the user access authentication is successful. When the identification information of the access control device 3000 is not included in the registered access control device identification information corresponded to other information in the access right information, the user's terminal 2000 may determine that the user access authentication has failed.

For example, in FIG. 7, when the user's terminal 2000 is "a" and the corresponding access control device 3000 is "first door," the user's terminal 2000 may determine that the access authentication is successful because identification information of "first door" is included in identification information of access control devices which are registered in the access right information and for which "a" has an access right. As another example, in FIG. 7, when the user's terminal 2000 is "a" and the corresponding access control device 3000 is "fourth door," the user's terminal 2000 may determine that the access authentication has failed because identification information of "fourth door" is not included in identification information of access control devices which are registered in the access right information and for which "a" has an access right.

Also, the user's terminal 2000 may perform user access authentication by comparing the access right information to the identification information of the user's terminal 2000.

In detail, when the access right information has registered access control device identification information corresponded to registered terminal identification information, the user's terminal 2000 may check whether the identification information of the user's terminal 2000 is included in the registered terminal identification information corresponded to the identification information acquired from the access control device 3000 and may determine that the access authentication is successful when the identification information of the user's terminal 2000 is included in the registered terminal identification information. Also, when the access right information has registered access control device identification information corresponded to registered terminal identification information, the user's terminal 2000 may check whether the identification information of the user's terminal 2000 is included in the registered terminal identification information corresponded to the identification information acquired from the access control device 3000 and may determine that the access authentication has failed when the identification information of the user's terminal 2000 is not included in the registered terminal identification information.

For example, in FIG. 8, when the user's terminal 2000 is "b" and the corresponding access control device 3000 is "first door," the user's terminal 2000 may determine that the access authentication is successful because identification information of "b" is included in identification information of registered terminals which are in the access right information and to which an access right for "first door" is assigned. As another example, in FIG. 8, when the user's terminal 2000 is "b" and the corresponding access control device 3000 is "second door," the user's terminal 2000 may determine that the access authentication has failed because identification information of "b" is not included in identification information of terminals which are registered in the access right information and to which an access right for "second door" is assigned.

Also, the user's terminal 2000 may perform user access authentication by comparing the access right information to biometric information acquired from a user.

In detail, the access right information includes registered biometric information. The user's terminal 2000 may check whether biometric information acquired from a user is included in the access right information, and may determine that the access authentication is successful when the biometric information acquired from the user is included in the access right information. Also, the access right information includes registered biometric information. The user's terminal 2000 may check whether biometric information acquired from a user is included in the access right information, and may determine that the access authentication has failed when the biometric information acquired from the user is not included in the access right information.

Also, when the biometric information received from a user is included in the registered biometric information corresponded to other information in the access right information, the user's terminal 2000 may determine that the user access authentication is successful. When the biometric information received from a user is not included in the registered biometric information corresponded to other information in the access right information, the user's terminal 2000 may determine that the user access authentication has failed.

For example, in FIG. 7, when the user's biometric information is "a" and the corresponding access control device 3000 is "first door," the user's terminal 2000 may determine that the access authentication is successful because identification information of "first door" is included in identification information of access control devices which are registered in the access right information and for which "a" has an access right. As another example, in FIG. 7, when the user's biometric information is "a" and the corresponding access control device 3000 is "fourth door," the user's terminal 2000 may determine that the access authentication has failed because identification information of "fourth door" is not included in identification information of access control devices which are registered in the access right information and for which "a" has an access right.

Also, the user's terminal 2000 may perform user access authentication by comparing the access right information to the current time.

In detail, the user's terminal 2000 may check whether the current time is included in access schedule information and may determine that the access authentication is successful when the current time is included in the access schedule information. Also, the user's terminal 2000 may check whether the current time is included in access schedule information, and may determine that the access authentication has failed when the current time is not included in the access schedule information.

Also, the user's terminal 2000 may check whether the current time is included in access schedule information corresponded to the identification information of the access control device 3000, which is included in the information corresponded to the access right information, and may determine that the access authentication has failed when the current time is not included in the access schedule information corresponded to the identification information of the access control device 3000.

Also, the user's terminal 2000 may check whether the current time is included in access schedule information corresponded to the identification information of the user's terminal 2000, which is included in the information corresponded to the access right information, and may determine that the access authentication has failed when the current time is not included in the access schedule information corresponded to the identification information of the user's terminal 2000.

Also, the user's terminal 2000 may check whether the current time is included in access schedule information corresponded to acquired biometric information, which is included in the information corresponded to the access right information, and may determine that the access authentication has failed when the current time is not included in the access schedule information corresponded to the acquired biometric information.

For example, in FIG. 7, when the user's terminal 2000 is "a," the user's biometric information is "a'," and the corresponding access control device 3000 is "first door," the user's terminal 2000 determines that the access authentication is successful. Even in this case, however, when the current time is 8:00 AM, the user's terminal 2000 may determine that the access authentication has failed because the current time is not included in access schedule information corresponding to "first door." As another example, in FIG. 7, when the user's terminal 2000 is "a," the user's biometric information is "a'," and the corresponding access control device 3000 is "first door," the user's terminal 2000 determines that the access authentication is successful. Even in this case, however, when the current time is 8:00 AM, the user's terminal 2000 may determine that the access authentication has failed because the current time is not included in access schedule information corresponding to "a" and/or "a'."

Also, the user's terminal 2000 may perform user access authentication information according to whether the access right information has expired.

In detail, the user's terminal 2000 may check whether the access right information has expired, and may determine that the access authentication has failed when the access right information has expired.

Even though the user's terminal 2000 has determined that the access authentication was successful, the user's terminal 2000 may determine that the access authentication has failed when the access right information has expired. Alternatively, when the access light information has expired, the user's terminal 2000 may immediately determine that the access authentication has failed.

For example, in FIG. 7, when the user's terminal 2000 is "a," the user's biometric information is "a'," and the corresponding access control device 3000 is "first door," the user's terminal 2000 determines that the access authentication is successful. Even in this case, however, when five hours, which indicate the validity period of the access right information, have passed and thus the access right information has expired, the user's terminal 2000 may determine that the access authentication has failed. Also, in FIG. 7, when five hours, which indicates the validity period of the access right information, have passed and thus the access right information has expired, the user's terminal 2000 may determine that the access authentication has failed.

The user's terminal 2000 may compare the received identification information with the registered access control device identification information of the access right information, and determine that the access authentication is successful when the received identification information is matched to one of the registered access control device identification information.

Also, the user's terminal 2000 may compare current time with the access schedule information related to the received identification information of the access right information, and determine that the access authentication has failed when the current time is not included in access schedule.

Also, the user's terminal 2000 may compare identification information of the user's terminal 2000 with the registered terminal identification information related to the received identification information, and determine that the access authentication has failed when the identification information of the user's terminal 2000 is not matched to one of the registered terminal identification information corresponded to the received identification information.

Also, the user's terminal 2000 may prevent the step of the determining whether or not the user is allowed to access to the target door when the access right information has expired.

Also, the user's terminal 2000 may compare the received biometric information of the user with the registered biometric information, and determine that the access authentication is successful when biometric information of the user is matched to one of the registered biometric information.

Also, the user's terminal 2000 may compare current time with the access schedule information related to the received biometric information of the user of the access right information, and determine that the access authentication has failed when the current time is not included in access schedule.

Also, the user's terminal 2000 may compare identification information of the user's terminal 2000 with the registered terminal identification information related to the received biometric information of the user, and determine that the access authentication has failed when the identification information of the user's terminal 2000 is not matched to one of the registered terminal identification information corresponded to the received biometric information of the user.

An access authentication method is not limited to the above-described methods and may be provided even in a combination of the above-described methods.

Figure 9:
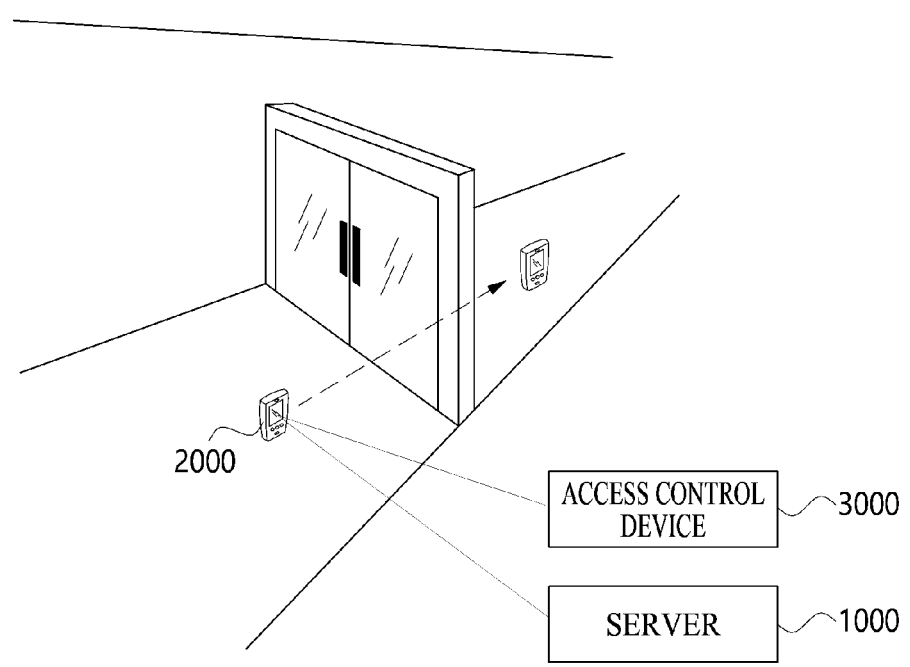
FIG. 9 is a surrounding view for an access control method according to an embodiment of the present disclosure.

FIG. 9 is a surrounding view of the access control method according to an embodiment of the present disclosure.

As shown in FIG. 9 as an example, according to the access control method according to an embodiment, the user's terminal 2000 may receive identification information and/or biometric information from the access control device 3000, and the user's terminal 2000 may perform user access authentication on the basis of access authentication information. When the user access authentication is successful, a user may access a corresponding door.

An access control method of the access control system 10000 in which the user's terminal 2000 performs access authentication will be described below with reference to FIGS. 10, 11, and 12.

Figure 10:
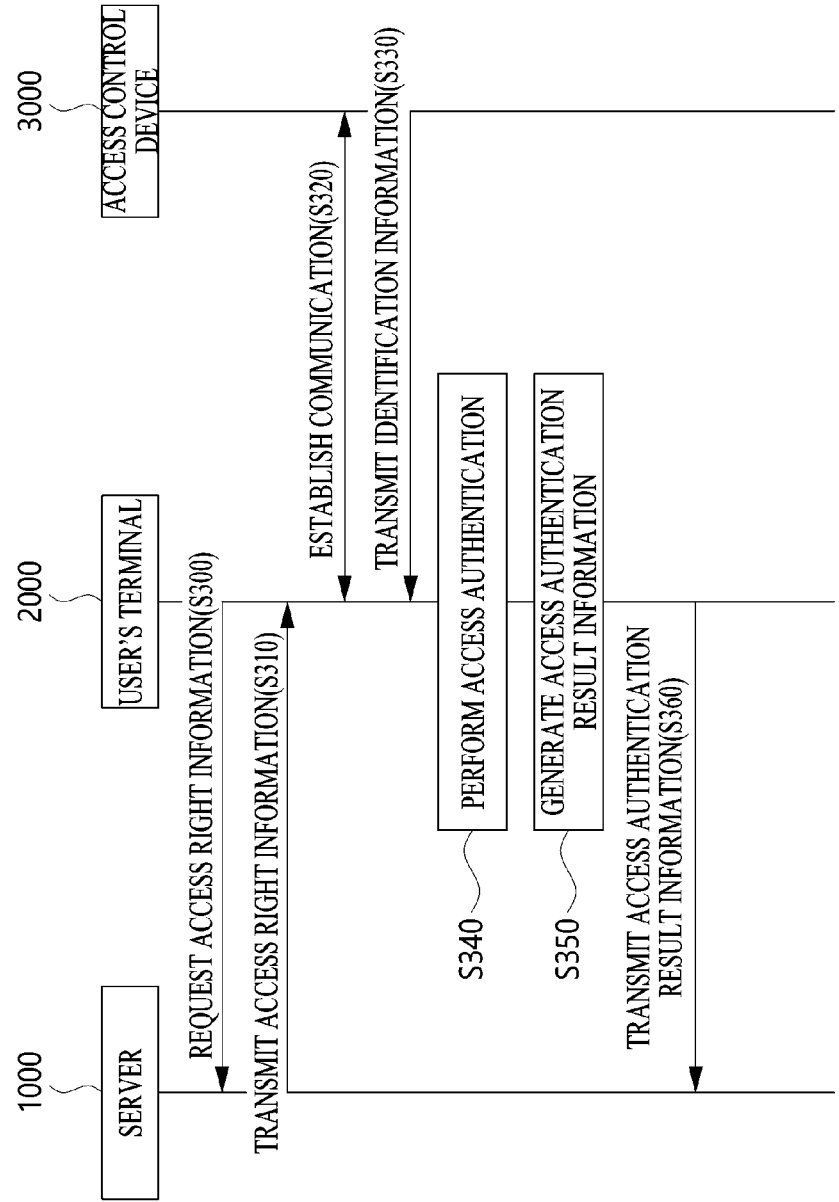
FIG. 10 is a flowchart of a method for managing an access authentication result according to an embodiment of the present disclosure.

FIG. 10 is a flowchart of a method for managing an access authentication result according to an embodiment of the present disclosure. The user's terminal 2000 approaches the access control device 3000, performs access authentication, and transmits the result to the server 1000. Thus, the access authentication result may be managed by the server 1000.

Thus, the access control system 10000 may be utilized for time and attendance management of workers or the like.

Referring to FIG. 10, the method for managing an access authentication result may include the user's terminal 2000 requesting access right information from the server 1000 (S300), the server 1000 transmitting the access right information to the user's terminal 2000 (S310), establishing a communication between the user's terminal 2000 and the access control device 3000 (S320), the access control device 3000 transmitting identification information to the user's terminal 2000 (S330), the user's terminal 2000 performing access authentication (S340), the user's terminal 2000 generating access authentication result information (S350), and the user's terminal 2000 transmitting the access authentication result information to the server 1000 (S360).

According to some embodiments of the present disclosure, the step of the user's terminal 2000 requesting access right information from the server 1000 (S300) may be performed.

The user's terminal 2000 may have the access right information prestored therein or may request the access right information from the server 1000.

For example, when the access right information is not stored, the user's terminal 2000 may automatically request the access right information from the server 1000. Also, when the access right information has expired, the user's terminal 2000 may automatically request the access right information from the server 1000.

Alternatively, when a user request is input, the user's terminal 2000 may request the access right information from the server 1000. For example, even though the access right information is stored in the user's terminal 2000, a user may want to update the access right information or may not know that the access right information is stored. In this case, the user may input a request to the user's terminal 2000, and the user's terminal 2000 may request the access right information from the server 1000.

Step S300 is not necessarily required and may be omitted according to some embodiments.

Also, according to some embodiments of the present disclosure, the step of the server 1000 transmitting the access right information to the user's terminal 2000 (S310) may be performed.

When an access right information request is received from the user's terminal 2000, the server 1000 may transmit the access right information to the user's terminal 2000. For example, when a user enters a request for the access right information to the server 1000 because the access right information is not stored in the user's terminal 2000 or because the access right information has expired, the server 1000 may transmit the access right information to the user's terminal 2000.

Alternatively, even when an access right information request is not received from the user's terminal 2000, the server 1000 may transmit the access right information to the user's terminal 2000. For example, the server 1000 may check whether the access right information is stored in the user's terminal 2000 through periodic communication with the user's terminal 2000 and may automatically transmit the access right information to the user's terminal 2000 when the access right information is not stored.

When the server 1000 transmits the access right information to the user's terminal 2000, the user's terminal 2000 may receive the access right information and store the received access right information in the terminal storage unit 2500.

Step S310 is not necessarily required and may be omitted according to some embodiments.

According to some embodiments of the present disclosure, the step of establishing a communication between the user's terminal 2000 and the access control device 3000 (S320) may be performed.

When the user's terminal 2000 approaches the access control device 3000, the user's terminal 2000 may detect the access control device 3000 and establish a communication channel with the access control device 3000. In this case, when the communication channel is established, the user's terminal 2000 or the access control device 3000 may output a notification to the outside.

The communication between the user's terminal 2000 and the access control device 3000 may be performed according to a short-range communication standard such as BLE, Bluetooth, NFC, and Wi-Fi.

According to some embodiments of the present disclosure, the step of the access control device 3000 transmitting identification information to the user's terminal 2000 (S330) may be performed.

When a communication channel with the user's terminal 2000 is established, the access control device 3000 may automatically transmit the identification information of the access control device 3000 to the user's terminal 2000. Alternatively, when a request for the identification information is received from the user's terminal 2000, the access control device 3000 may transmit the identification information to the user's terminal 2000. Also, the step of the access control device 3000 transmitting the identification information to the user's terminal 2000 and the step of establishing a communication channel between the user's terminal 2000 and the access control device 3000 may be performed at the same time.

According to some embodiments of the present disclosure, the step of the user's terminal 2000 performing access authentication (S340) may be performed.

The user's terminal 2000 may perform user access authentication by at least one of the access authentication methods (S210) that have been described on the basis of the access right information prestored in the terminal storage unit 2500.

According to some embodiments of the present disclosure, the step of the user's terminal 2000 generating access authentication result information (S350) may be performed.

The user's terminal 2000 may perform access authentication, and may generate result information indicating the success of the access authentication when the access authentication is successful. Alternatively, the user's terminal 2000 may perform the access authentication, and may generate result information indicating the failure of the access authentication when the access authentication has failed. In this case, the user's terminal 2000 may output a visual notification indicating the authentication result through the terminal display unit 2200 or may output a voice notification message indicating the authentication result through a separate output unit.

According to some embodiments of the present disclosure, the step of the user's terminal 2000 transmitting the access authentication result information to the server 1000 (S360) may be performed.

The user's terminal 2000 may transmit the generated access authentication result information to the server 1000.

The server 1000 may receive and store the access authentication result information in the server storage unit 1300.

Figure 11:
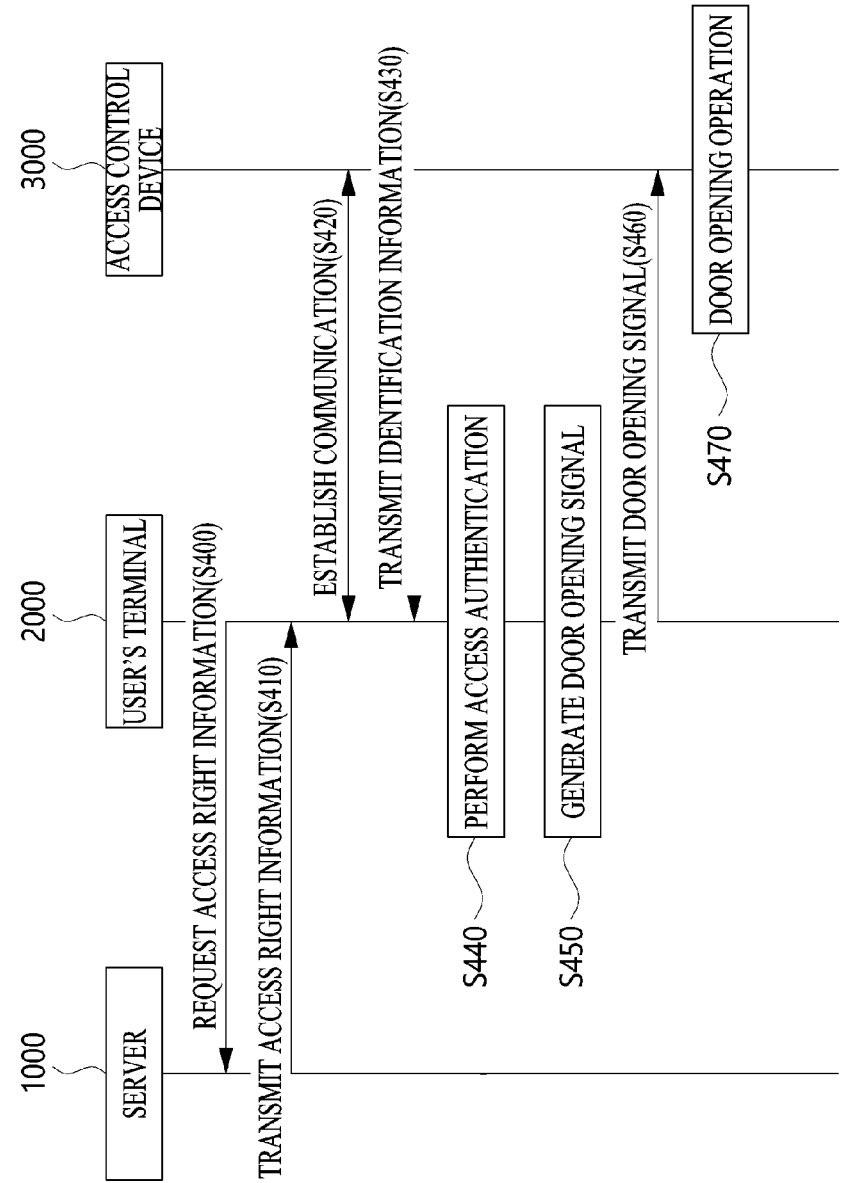
FIG. 11 is a flowchart of a method for managing a door opening according to an embodiment of the present disclosure.

FIG. 11 is a flowchart of a method for managing a door opening according to an embodiment of the present disclosure. The user's terminal 2000 may control a door opening or closing operation by approaching the access control device 3000, performing access authentication, and transmitting a door opening signal to the access control device 3000. Thus, the access control system 10000 may utilize the user's terminal 2000 as a door access means.

Referring to FIG. 11, the method for managing a door opening may include the user's terminal 2000 requesting access right information from the server 1000 (S400), the server 1000 transmitting the access right information to the user's terminal 2000 (S410), establishing a communication between the user's terminal 2000 and the access control device 3000 (S420), the access control device 3000 transmitting identification information to the user's terminal 2000 (S430), the user's terminal 2000 performing access authentication (S440), the user's terminal 2000 generating a door opening signal (S450), the user's terminal 2000 transmitting the door opening signal to the access control device 3000 (S460), and the access control device 3000 performing a door opening operation (S470).

According to some embodiments of the present disclosure, the step of the user's terminal 2000 requesting the access right information from the server 1000 (S400) may be performed.

Step S400 is performed similarly to step S300, which has been described above, and thus a detailed description thereof will be omitted.

Step S400 is not necessarily required and may be omitted according to some embodiments.

Also, according to some embodiments of the present disclosure, the step of the server 1000 transmitting the access right information to the user's terminal 2000 (S410) may be performed.

Step S410 is performed similarly to step S310, which has been described above, and thus a detailed description thereof will be omitted.

Step S410 is not necessarily required and may be omitted according to some embodiments.

According to some embodiments of the present disclosure, the step of establishing a communication channel between the user's terminal 2000 and the access control device 3000 (S420) may be performed.

Step S420 is performed similarly to step S320, which has been described above, and thus a detailed description thereof will be omitted.

According to some embodiments of the present disclosure, the step of the access control device 3000 transmitting identification information to the user's terminal 2000 (S430) may be performed.

Step S430 is performed similarly to step S330, which has been described above, and thus a detailed description thereof will be omitted.

According to some embodiments of the present disclosure, the step of the user's terminal 2000 performing access authentication (S440) may be performed.

Step S440 is performed similarly to step S340, which has been described above, and thus a detailed description thereof will be omitted.

According to some embodiments of the present disclosure, the step of the user's terminal 2000 generating a door opening signal (S450) may be performed.

Also, when a user succeeds in the access authentication, the user's terminal 2000 may generate a door opening signal to be transmitted to the access control device 3000. The door opening signal may force the access control device 3000 to perform a door opening operation. In other words, when the door opening signal is transmitted from the user's terminal 2000 to the access control device 3000, the control unit 3700 may change the access control device 3000 to a door opening state through the power unit 3600. However, the user's terminal 2000 may not generate a door opening signal when the user access authentication has failed.

According to some embodiments of the present disclosure, the step of the user's terminal 2000 transmitting the door opening signal to the access control device 3000 (S460) may be performed.

The user's terminal 2000 may transmit the door opening signal to the access control device 3000. For example, the user's terminal 2000 may transmit the door opening signal to the access control device 3000 through wireless communication such as BLE, Bluetooth, WLAN, WiFi, WiFi Direct, NFC, IrDA, UWB, and Zigbee.

Also, in order to prevent an undesired door from being opened, the user's terminal 2000 may transmit the door opening signal to the access control device 3000 when the distance between the user's terminal 2000 and the access control device 3000 is less than or equal to a certain distance.

In this case, the user's terminal 2000 may transmit the door opening signal to the access control device 3000, and the access control device 3000 may transmit a positive acknowledgement signal (ACK) to the user's terminal 2000 when the door opening signal is successfully received. Also, the user's terminal 2000 may transmit the door opening signal to the access control device 3000, and the access control device 3000 may transmit a negative acknowledgement signal (NACK) when the door opening signal is not successfully received. In this case, when the user's terminal 2000 receives the positive acknowledgement signal from the access control device 3000, the access control device 3000 may transmit, to the server 1000, information indicating that the door is opened. Conversely, when the user's terminal 2000 receives the negative acknowledgement signal from the access control device 3000, the access control device 3000 may transmit, to the server 1000, information indicating that the door is not opened.

Also, according to some embodiments, the step of the access control device 3000 performing the door opening operation (S470) may be performed.

When the access control device 3000 receives the door opening signal from the user's terminal 2000, the access control device 3000 may provide power through the power unit 3600 so that a door leaf can become unlocked. Also, when the door is an automatic door, the access control device 3000 may provide power through the power unit 3600 so that the door leaf can become opened.

After the door leaf is unlocked, the access control device 3000 may provide power through the power unit 3600 so that the door leaf is locked on the basis of a locking condition. The access control device 3000 may determine whether the door leaf is reclosed on the basis of a signal acquired from the sensor unit 3400. When the door leaf is reclosed, the access control device 3000 may provide power through the power unit 3600 such that the door leaf can be locked. Also, the access control device 3000 may provide power through the power unit 3600 in additional consideration of a locking standby time so that the door leaf can be locked after the locking standby time even though the door leaf is reclosed. Also, by outputting at least one of auditory information, visual information, and vibration through the display unit 3200, the voice output unit 3300, and/or a separate output unit, the access control device 3000 may notify that the door is opened.

In the above-described door opening management method, although not shown, the step of the user's terminal 2000 generating access authentication result information (S350) and the step of the user's terminal 2000 transmitting the access authentication result information to the server 1000 (S360) may also be performed after the step of the user's terminal 2000 performing the access authentication (S440).

Figure 12:
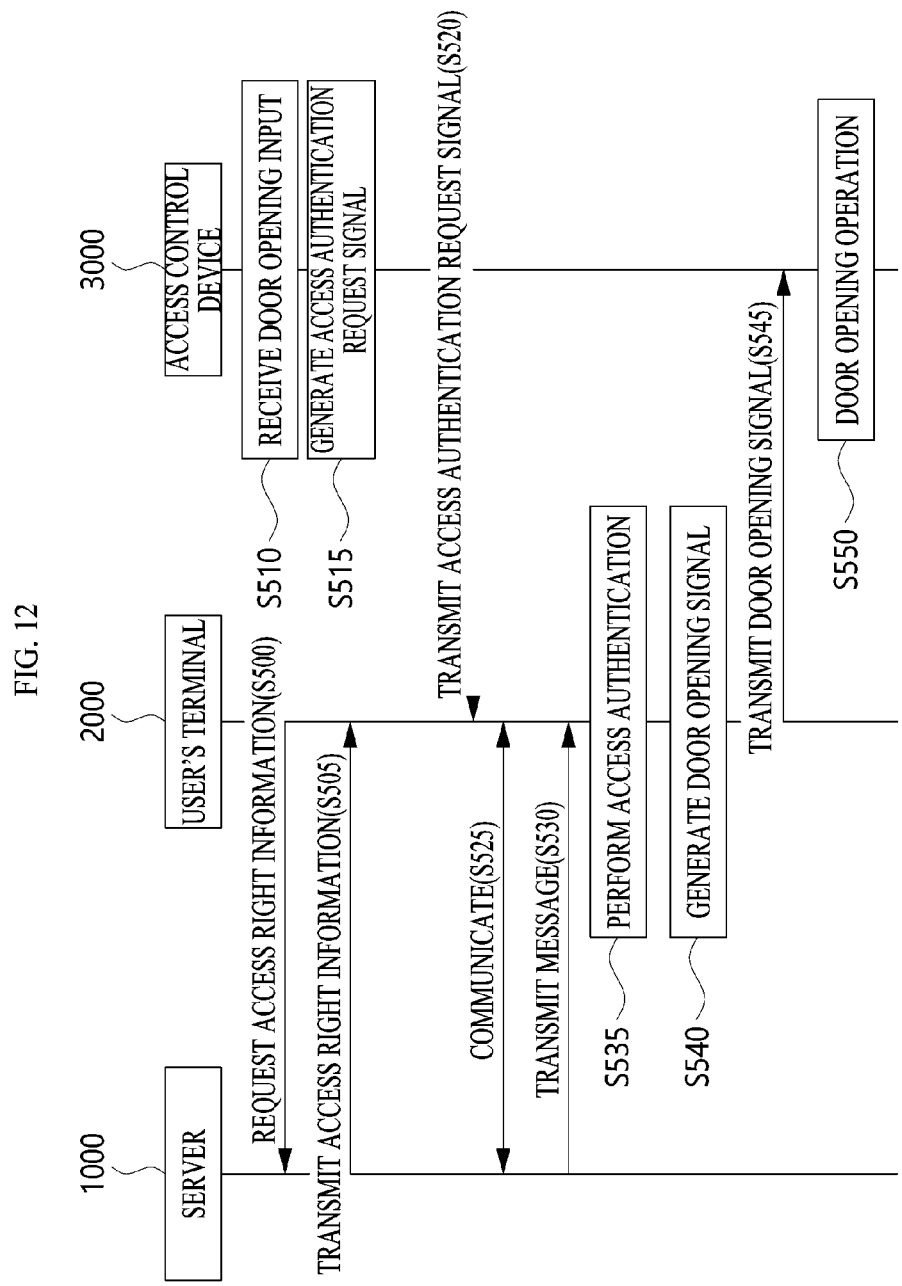
FIG. 12 is a flowchart of a method for notifying information upon door access according to an embodiment of the present disclosure.

FIG. 12 is a flowchart of a method for notifying information upon door access according to an embodiment of the present disclosure. It is assumed that a door is implemented with an automatic door or the like that requires a door opening input by pressing a switch to open the door. When a user approaches the access control device 3000 to enter a door opening input through the input unit 3900 to open a door, the user's terminal 2000 may receive an access authentication request signal from the access control device 3000 and acquire a pre-designated message from the server 1000 in communication with the server 1000. Thus, the access control system 10000 may utilize the user's terminal 2000 as a means for advertisement or information notification when the door is accessed.

Referring to FIG. 12, the method for notifying information upon door access may include the user's terminal 2000 requesting access right information from the server 1000 (S500), the server 1000 transmitting the access right information to the user's terminal 2000 (S505), the access control device 3000 receiving a door opening input (S510), the access control device 3000 generating an access authentication request signal (S515), the access control device 3000 transmitting the access authentication request signal to the user's terminal 2000 (S520), the user's terminal 2000 communicating with the server 1000 (S525), the server 1000 transmitting a message to the user's terminal 2000 (S530), the user's terminal 2000 performing access authentication (S535), the user's terminal 2000 generating a door opening signal (S540), the user's terminal 2000 transmitting the door opening signal to the access control device 3000 (S545), and the access control device 3000 performing a door opening operation (S550).

According to some embodiments of the present disclosure, the step of the user's terminal 2000 requesting access right information from the server 1000 (S500) may be performed.

Step S500 is performed similarly to step S300, which has been described above, and thus a detailed description thereof will be omitted.

Step S500 is not necessarily required and may be omitted according to some embodiments.

Also, according to some embodiments of the present disclosure, the step of the server 1000 transmitting the access right information to the user's terminal 2000 (S505) may be performed.

Step S505 is performed similarly to step S310, which has been described above, and thus a detailed description thereof will be omitted.

Step S505 is not necessarily required and may be omitted according to some embodiments.

According to some embodiments of the present disclosure, the step of the access control device 3000 receiving a door opening input (S510) may be performed.

For example, it is assumed that a door is implemented with an automatic door that is opened only when a switch is pressed to provide a door opening input. When the door opening input is received, the access control device 3000 may generate an input signal for opening the door.

According to some embodiments of the present disclosure, the step of the access control device 3000 generating an access authentication request signal (S515) may be performed.

For example, the access control device 3000 may generate an access authentication request signal according to an input signal generated by a door opening input. In this case, the access authentication request signal may be a signal including the identification information of the access control device 3000.

According to some embodiments of the present disclosure, the step of the access control device 3000 transmitting the access authentication request signal to the user's terminal 2000 (S520) may be performed.

The access control device 3000 may transmit the access authentication request signal to the user's terminal 2000. The user's terminal 2000 may perform user access authentication when the access authentication request signal is received. Also, the access authentication request signal may include a signal including the identification information of the access control device 3000. Also, the access control device 3000 may transmit the identification information of the access control device 3000 to the user's terminal 2000 separately from the transmission of the access authentication request signal.

For example, when a communication between the access control device 3000 and the user's terminal 2000 is performed through BLE, the transmission of the access authentication request signal may mean that the access control device 3000 transmits an advertising signal to the user's terminal 2000.

According to some embodiments of the present disclosure, the step of the user's terminal 2000 communicating with the server 1000 (S525) may be performed.

When the access authentication request signal is received from the access control device 3000, the user's terminal 2000 may communicate with the server 1000. For example, when the access authentication request signal is received from the access control device 3000, the user's terminal 2000 may automatically transmit a signal for requesting a pre-designated message to the server 1000.

According to some embodiments of the present disclosure, the step of the server 1000 transmitting a message to the user's terminal 2000 (S530) may be performed.

The server 1000 may transmit the pre-designated message to the user's terminal 2000. For example, when an advertisement message is designated, the server 1000 may transmit the advertisement message to the user's terminal 2000. Also, when a notification message is designated, the server 1000 may transmit the notification message to the user's terminal 2000. In this case, a plurality of messages may be designated, and a different message may be designated according to the current time from among a plurality of messages stored in the server 1000.

According to some embodiments of the present disclosure, the step of the user's terminal 2000 performing access authentication (S535) may be performed.

Step S535 is performed similarly to step S340, which has been described above, and thus a detailed description thereof will be omitted.

According to some embodiments of the present disclosure, the step of the user's terminal 2000 generating a door opening signal (S540) may be performed.

Step S540 is performed similarly to step S450, which has been described above, and thus a detailed description thereof will be omitted.

According to some embodiments of the present disclosure, the step of the user's terminal 2000 transmitting the door opening signal to the access control device 3000 (S545) may be performed.

Step S545 is performed similarly to step S460, which has been described above, and thus a detailed description thereof will be omitted.

Also, according to some embodiments, the step of the access control device 3000 performing the door opening operation (S550) may be performed.

Step S550 is performed similarly to step S470, which has been described above, and thus a detailed description thereof will be omitted.

In the above-described information notification method upon door opening, although not shown, the step of the user's terminal 2000 generating access authentication result information (S350) and the step of the user's terminal 2000 transmitting the access authentication result information to the server 1000 (S360) may also be performed after the step of the user's terminal 2000 performing the access authentication (S535).

An access control method using a user's biometric information in the access control system 10000 in which the user's terminal 2000 performs access authentication will be described below with reference to FIGS. 13 and 14.

Figure 13:
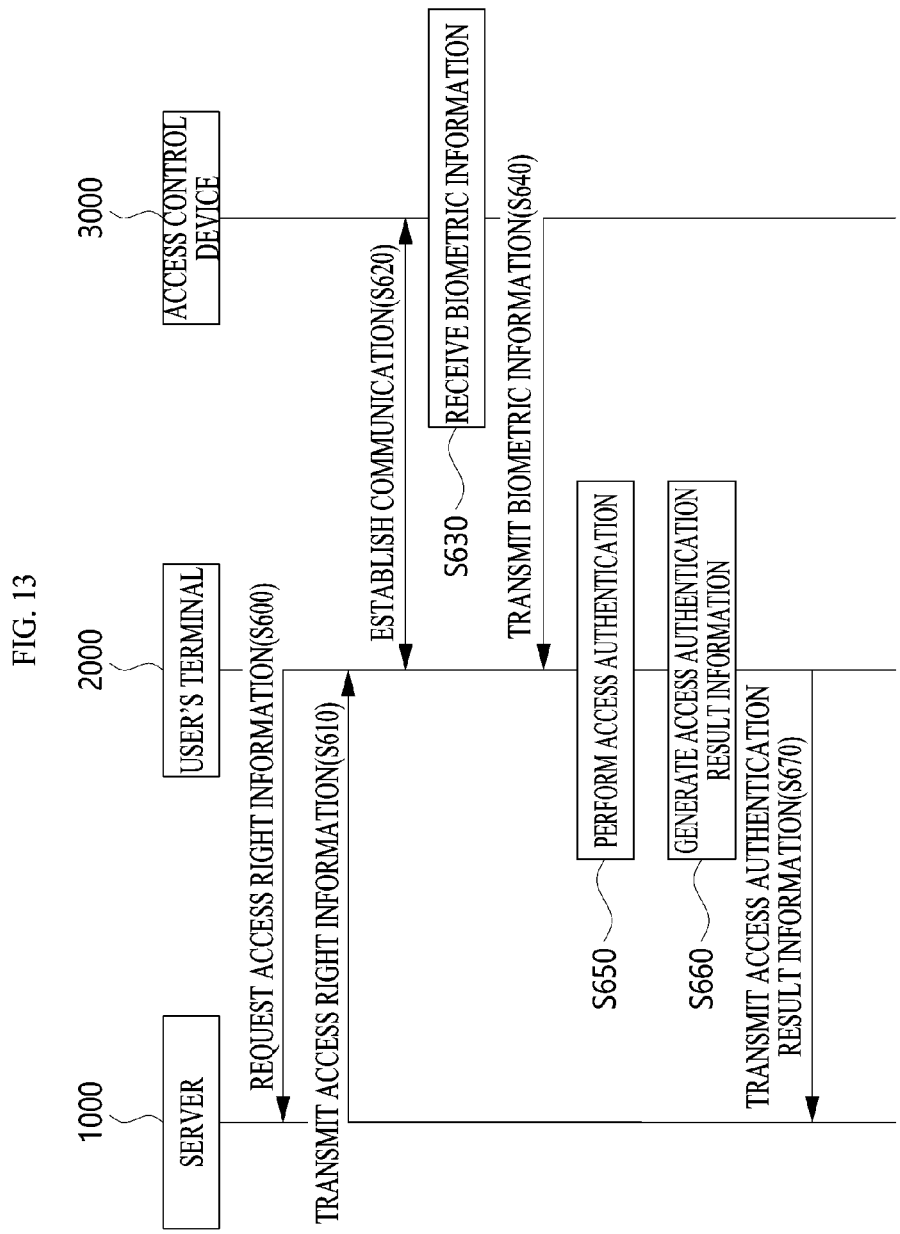
FIG. 13 is a flowchart of a method for managing an access authentication result using biometric information according to an embodiment of the present disclosure.

FIG. 13 is a flowchart of a method for managing an access authentication result using biometric information according to an embodiment of the present disclosure. The user's terminal 2000 approaches the access control device 3000, performs access authentication, and transmits the result to the server 1000. Thus, the access authentication result may be managed by the server 1000. In this case, security-enhanced access authentication may be performed using a user's biometric information received from the access control device 3000. Thus, the access control system 10000 may be utilized for time and attendance management of workers or the like.

Referring to FIG. 13, the method for managing an access authentication result using biometric information may include the user's terminal 2000 requesting access right information from the server 1000 (S600), the server 1000 transmitting the access right information to the user's terminal 2000 (S610), establishing a communication between the user's terminal 2000 and the access control device 3000 (S620), the access control device 3000 receiving biometric information (S630), the access control device 3000 transmitting the biometric information to the user's terminal 2000 (S640), the user's terminal 2000 performing access authentication (S650), the user's terminal 2000 generating access authentication result information (S660), and the user's terminal 2000 transmitting the access authentication result information to the server 1000 (S670).

According to some embodiments of the present disclosure, the step of the user's terminal 2000 requesting access right information from the server 1000 (S600) may be performed.

Step S600 is performed similarly to step S300, which has been described above, and thus a detailed description thereof will be omitted.

Step S600 is not necessarily required and may be omitted according to some embodiments.

Also, according to some embodiments of the present disclosure, the step of the server 1000 transmitting the access right information to the user's terminal 2000 (S610) may be performed.

Step S610 is performed similarly to step S310, which has been described above, and thus a detailed description thereof will be omitted.

Step S610 is not necessarily required and may be omitted according to some embodiments.

According to some embodiments of the present disclosure, the step of establishing a communication between the user's terminal 2000 and the access control device 3000 (S620) may be performed.

Step S620 is performed similarly to step S320, which has been described above, and thus a detailed description thereof will be omitted.

According to some embodiments of the present disclosure, the step of the access control device 3000 receiving biometric information (S630) may be performed.

The access control device 3000 may receive biometric information from a user through the biometric-information input unit 3800 and may acquire the user's biometric information.

The user's biometric information may refer to one of the user's fingerprint information, iris information, face information, vein information, and voice information. For example, when the biometric-information input unit 3800 is a screen scanner for acquiring a user's fingerprint information, the access control device 3000 may receive and acquire the user's fingerprint information. Also, when the biometric-information input unit 3800 is a microphone for acquiring a user's voice information, the access control device 3000 may receive and acquire the user's voice information. Also, when the biometric-information input unit 3800 is a camera for acquiring a user's iris information, the access control device 3000 may receive and acquire the user's iris information.

According to some embodiments of the present disclosure, the step of the access control device 3000 transmitting the biometric information to the user's terminal 2000 (S640) may be performed.

When the biometric information is acquired from the user, the access control device 3000 may automatically transmit the acquired biometric information to the user's terminal 2000. Alternatively, when a request for the biometric information is received from the user's terminal 2000, the access control device 3000 may transmit the acquired biometric information to the user's terminal 2000.

In this case, for the purpose of security, the access control device 3000 may encrypt the acquired biometric information and transmit the encrypted biometric information to the user's terminal 2000. For example, the access control device 3000 may encrypt the acquired biometric information with a public key of the access control device 3000.

Also, the access control device 3000 may transmit the identification information of the access control device 3000 to the user's terminal 2000 in addition to the biometric information. Alternatively, the access control device 3000 may transmit the identification information of the access control device 3000 to the user's terminal 2000 in addition to the biometric information.

According to some embodiments of the present disclosure, the step of the user's terminal 2000 performing access authentication (S650) may be performed.

The user's terminal 2000 may perform access authentication using the biometric information received from the access control device 3000. In this case, when the biometric information is encrypted by the access control device 3000, the user's terminal 2000 may decrypt the encrypted biometric information and perform access authentication. For example, when the biometric information acquired from the access control device 3000 is encrypted with the public key of the access control device 3000, the user's terminal 2000 may decrypt the encrypted biometric information with a private key of the access control device 3000 and then perform the access authentication.

Step S650 is performed similarly to step S340, which has been described above, and thus a detailed description thereof will be omitted.

According to some embodiments of the present disclosure, the step of the user's terminal 2000 generating access authentication result information (S660) may be performed.

Step S660 is performed similarly to step S350, which has been described above, and thus a detailed description thereof will be omitted.

According to some embodiments of the present disclosure, the step of the user's terminal 2000 transmitting the access authentication result information to the server 1000 (S670) may be performed.

Step S670 is performed similarly to step S360, which has been described above, and thus a detailed description thereof will be omitted.

In the above-described access authentication result management method using biometric information, although not shown, the user's terminal 2000 acquiring a user's biometric information in order to perform user access authentication may mean that the user's terminal 2000 receives and acquires biometric information from the user without using the step of the access control device 3000 receiving biometric information (S630) and the step of the access control device 3000 transmitting the biometric information to the user's terminal 2000 (S640). The user's biometric information may refer to one of the user's fingerprint information, iris information, face information, vein information, and voice information. For example, when the terminal biometric-information input unit 2700 is a screen scanner for acquiring a user's fingerprint information, the user's terminal 2000 may receive and acquire the user's fingerprint information. Also, when the terminal biometric-information input unit 2700 is a microphone for acquiring a user's voice information, the user's terminal 2000 may receive and acquire the user's voice information. Also, when the terminal biometric-information input unit 2700 is a camera for acquiring a user's iris information, the user's terminal 2000 may receive and acquire the user's iris information.

Figure 14:
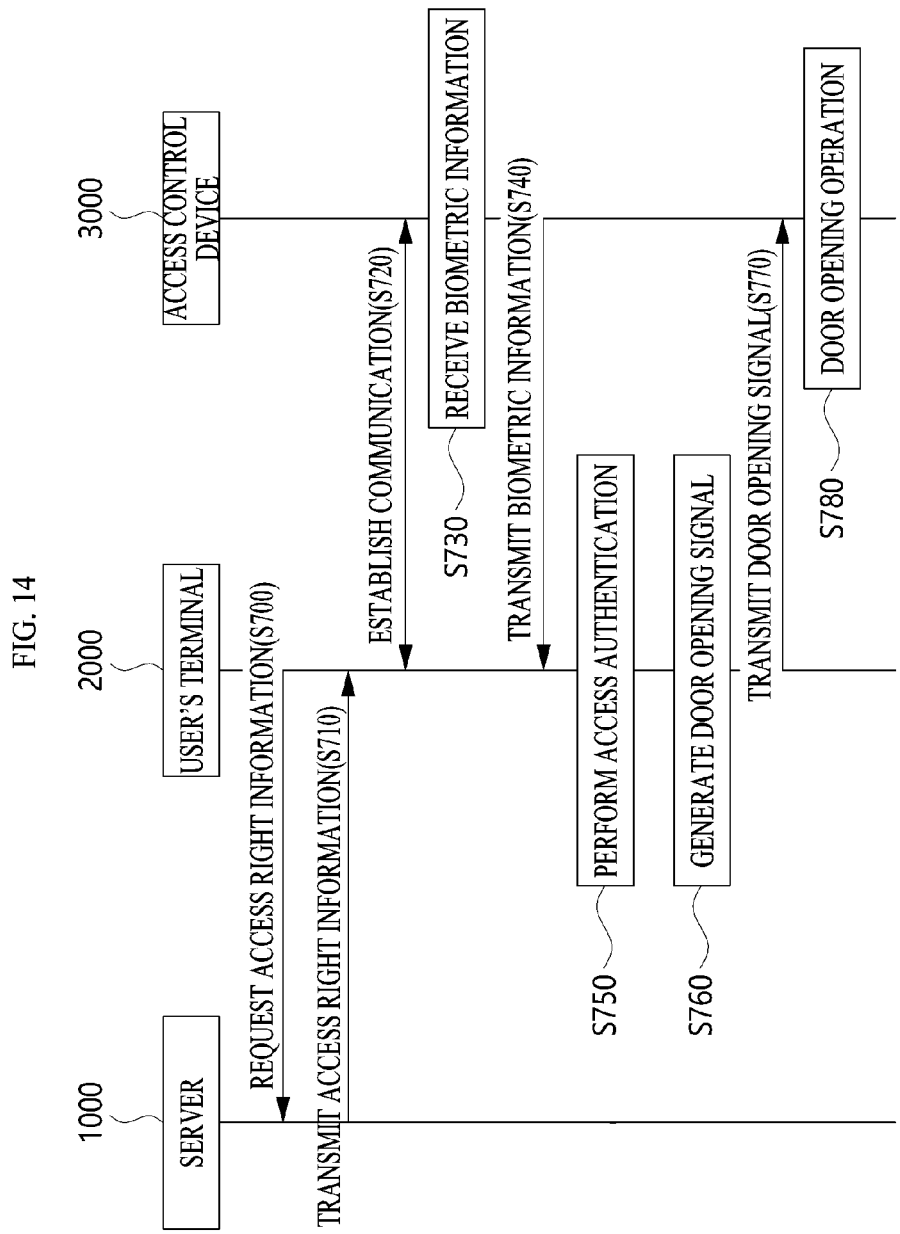
FIG. 14 is a flowchart of a method for managing a door opening using biometric information according to an embodiment of the present disclosure.

FIG. 14 is a flowchart of a method for managing a door opening using biometric information according to an embodiment of the present disclosure. The user's terminal 2000 approaches the access control device 3000, performs access authentication, and transmits a door opening signal to the access control device 3000. Thus, the user's terminal 2000 may control a door opening or closing operation. In this case, the user's terminal 2000 may perform security-enhanced access authentication using the user's biometric information. Thus, the access control system 10000 may utilize the user's terminal 2000 as a door access means.

Referring to FIG. 14, the method for managing a door opening using biometric information may include the user's terminal 2000 requesting access right information from the server 1000 (S700), the server 1000 transmitting the access right information to the user's terminal 2000 (S710), establishing a communication between the user's terminal 2000 and the access control device 3000 (S720), the access control device 3000 receiving biometric information (S730), the access control device 3000 transmitting the biometric information to the user's terminal 2000 (S740), the user's terminal 2000 performing access authentication (S750), the user's terminal 2000 generating a door opening signal (S760), the user's terminal 2000 transmitting the door opening signal to the access control device 3000 (S770), and the access control device 3000 performing a door opening operation (S780).

According to some embodiments of the present disclosure, the step of the user's terminal 2000 requesting access right information from the server 1000 (S700) may be performed.

Step S700 is performed similarly to step S300, which has been described above, and thus a detailed description thereof will be omitted.

Step S700 is not necessarily required and may be omitted according to some embodiments.

Also, according to some embodiments of the present disclosure, the step of the server 1000 transmitting the access right information to the user's terminal 2000 (S710) may be performed.

Step S710 is performed similarly to step S310, which has been described above, and thus a detailed description thereof will be omitted.

Step S710 is not necessarily required and may be omitted according to some embodiments.

According to some embodiments of the present disclosure, the step of establishing a communication between the user's terminal 2000 and the access control device 3000 (S720) may be performed.

Step S720 is performed similarly to step S320, which has been described above, and thus a detailed description thereof will be omitted.

According to some embodiments of the present disclosure, the step of the access control device 3000 receiving biometric information (S730) may be performed.

Step S730 is performed similarly to step S630, which has been described above, and thus a detailed description thereof will be omitted.

According to some embodiments of the present disclosure, the step of the access control device 3000 transmitting the biometric information to the user's terminal 2000 (S740) may be performed.

Step S740 is performed similarly to step S640, which has been described above, and thus a detailed description thereof will be omitted.

According to some embodiments of the present disclosure, the step of the user's terminal 2000 performing access authentication (S750) may be performed.

Step S750 is performed similarly to step S650, which has been described above, and thus a detailed description thereof will be omitted.

According to some embodiments of the present disclosure, the step of the user's terminal 2000 generating a door opening signal (S760) may be performed.

Step S760 is performed similarly to step S450, which has been described above, and thus a detailed description thereof will be omitted.

According to some embodiments of the present disclosure, the step of the user's terminal 2000 transmitting the door opening signal to the access control device 3000 (S770) may be performed.

Step S770 is performed similarly to step S460, which has been described above, and thus a detailed description thereof will be omitted.

Also, according to some embodiments, the step of the access control device 3000 performing the door opening operation (S780) may be performed.

Step S780 is performed similarly to step S470, which has been described above, and thus a detailed description thereof will be omitted.

In the above-described access authentication result management method using biometric information, although not shown, the user's terminal 2000 acquiring a user's biometric information in order to perform user access authentication may mean that the user's terminal 2000 receives and acquires biometric information from the user without using the step of the access control device 3000 receiving biometric information (S730) and the step of the access control device 3000 transmitting the biometric information to the user's terminal 2000 (S740). The user's terminal 2000 may receive biometric information from a user through the terminal biometric-information input unit 2700 and may acquire the user's biometric information. The user's biometric information may refer to one of the user's fingerprint information, iris information, face information, vein information, and voice information. For example, when the terminal biometric-information input unit 2700 is a screen scanner for acquiring a user's fingerprint information, the user's terminal 2000 may receive and acquire the user's fingerprint information. Also, when the terminal biometric-information input unit 2700 is a microphone for acquiring a user's voice information, the user's terminal 2000 may receive and acquire the user's voice information. Also, when the terminal biometric-information input unit 2700 is a camera for acquiring a user's iris information, the user's terminal 2000 may receive and acquire the user's iris information.

In the above-described door opening management method, although not shown, the step of the user's terminal 2000 generating access authentication result information (S350) and the step of the user's terminal 2000 transmitting the access authentication result information to the server 1000 (S360) may also be performed after the step of the user's terminal 2000 performing the access authentication (S750).

4. Setting Change Method for Access Control Device

A conventional access control system required a procedure of changing the settings of an access control device through establishment of a network between the access control device and a management server in order to change the settings of the access control device. As a result, a problem arises in that a lot of cost and effort is required for wiring work to establish a network between the access control device and the management server.

Figure 15:
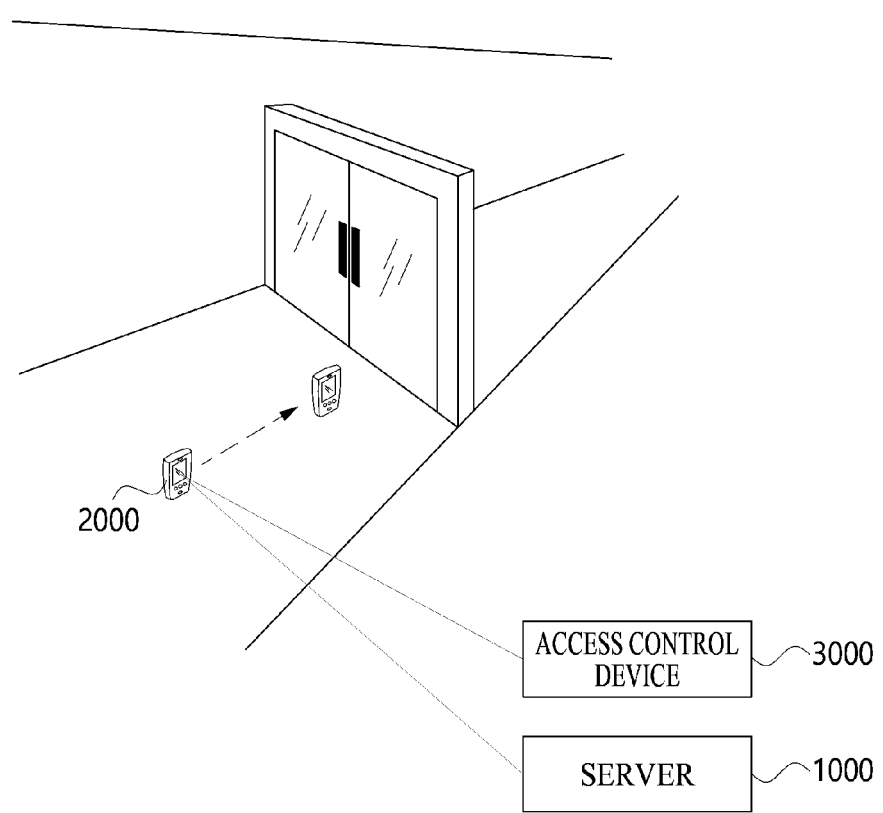
FIG. 15 is a surrounding view for a method for changing a setting of an access control device according to an embodiment of the present disclosure.

FIG. 15 is a surrounding view for a method for changing a setting of an access control device 3000 according to an embodiment of the present disclosure.

As illustrated in FIG. 15, in the method for changing a setting of an access control device 3000 according to an embodiment, the user's terminal 2000 inputs setting change information to generate a setting change signal and transmits the setting change signal to the access control device 3000 in a wireless communication manner so that a user of the user's terminal 2000 can change the settings of the access control device 3000.

In the setting change method for the access control device 3000 according to an embodiment, the management server may not be involved in a series of processes of the user's terminal 2000 performing an input to change the settings of the access control device 3000, generating a setting change signal, and transmitting the setting change signal to the access control device 3000.

Accordingly, unlike the conventional access control system, the setting change method for the access control device 3000 according to an embodiment can change the settings of the access control device 3000 without any problems when a user has a terminal even though no management server is networked with the access control device 3000.

The basic concept of the setting change method for the access control device 3000 according to an embodiment may be applied to the following various embodiments.

FIG. 16 is a flowchart of a method for changing a setting of an access control device 3000 according to an embodiment of the present disclosure. The user's terminal 2000 may change the settings of the access control device 3000 by receiving an input of changing the settings of the access control device 3000, approaching the access control device 3000, and transmitting a setting change signal to the access control device 3000.

Referring to FIG. 16, the method for changing a setting of an access control device 3000 may include the user's terminal 2000 establishing a communication with the access control device 3000 (S800), the user's terminal 2000 receiving setting change information (S810), the user's terminal 2000 receiving manager information (S820), the user's terminal 2000 generating a setting change signal (S830), the user's terminal 2000 transmitting a setting change signal to the access control device 3000 (S840), the access control device 3000 checking the manager information (S850), and changing the settings of the access control device 3000 (S860).

According to some embodiments of the present disclosure, the step of the user's terminal 2000 detecting the access control device 3000 to establish a communication (S800) may be performed.

The user's terminal 2000 may detect a nearby access control device 3000. For example, when the communication between the user's terminal 2000 and the access control device 3000 is performed through BLE communication, the user's terminal 2000 may receive an advertising signal from the access control device 3000 and detect the access control device 3000. After the user's terminal 2000 detects the access control device 3000, the user's terminal 2000 may establish a communication channel with the access control device 3000. In this case, when the communication channel is established, the user's terminal 2000 or the access control device 3000 may output a notification to the outside.

In this case, the user's terminal 2000 may collect recent connection records and distances from the access control device 3000.

The communication between the user's terminal 2000 and the access control device 3000 may be performed according to a short-range communication standard such as BLE, Bluetooth, NFC, and Wi-Fi.

According to some embodiments of the present disclosure, the step of the user's terminal 2000 receiving the setting change information (S810) may be performed.

The user's terminal 2000 may output a screen for receiving the setting change information through the terminal display unit 2200 and may receive information for a setting change performed by the access control device 3000 (hereinafter referred to as setting change information). In this case, the user's terminal 2000 may display a list of devices of which settings may be changed on the screen. When a device of which settings are to be changed is selected from the list of devices, a screen including setting items to be changed may be displayed on the terminal display unit 2200.

The user's terminal 2000 may receive information for changing communication interface settings of the access control device 3000. For example, when the access control device 3000 uses the RS-485 standard, the user's terminal 2000 may receive information for changing the value of baud rate or the like. As another example, when the access control device 3000 uses the Wiegand standard, the user's terminal 2000 may receive information for changing the Wiegand format, for example, from a 26-bit format to a 34-bit format.

Also, the user's terminal 2000 may receive information for changing PIN settings of the access control device 3000. For example, the user's terminal 2000 may receive information for changing the number of PIN digits.

Also, the user's terminal 2000 may receive information for changing settings of the display unit 3200 or the voice output unit 3300 of the access control device 3000. For example, the user's terminal 2000 may receive information for changing settings such that an LED of the access control device 3000 can output different colors of light depending on various situations. As another example, the user's terminal 2000 may receive information for changing settings such that a buzzer of the access control device 3000 can output different sounds depending on various situations.

Also, the user's terminal 2000 may receive information for changing a card type recognizable by the access control device 3000. For example, the user's terminal 2000 may receive information for changing a card type recognizable by the access control device 3000 from the Wiegand format to the Smart Card format.

Also, the user's terminal 2000 may receive information necessary for user access authentication in the access control device 3000. For example, the user's terminal 2000 may receive information that is necessary for access authentication and that is stored in the access control device 3000.

Also, the user's terminal 2000 may receive information for updating the firmware of the access control device 3000. For example, the user's terminal 2000 may receive information for updating the firmware embedded in the access control device 3000.

The above-described inputs of the setting change information of the access control device 3000 are just examples for convenience of description. Therefore, the present disclosure is not limited thereto, and a typical input type of the setting change information of the access control device 3000 may be utilized.

According to some embodiments of the present disclosure, the step of the user's terminal 2000 receiving manager information (S820) may be performed.

The user's terminal 2000 may receive manager information so that only a user having a setting change right can change the settings of the access control device 3000. For example, the manager information may be a manager password, and the user's terminal 2000 may receive a six-digit password.

According to some embodiments of the present disclosure, the step of the user's terminal 2000 generating a setting change signal (S830) may be performed.

The user's terminal 2000 may generate the setting change signal on the basis of the received setting change information. When the setting change signal is transmitted to the access control device 3000, the access control device 3000 is allowed to perform a setting change. The setting change signal may include data necessary for the access control device 3000 to perform the setting change. Also, the user's terminal 2000 may generate a setting change signal including the received manager information.

According to some embodiments of the present disclosure, the step of the user's terminal 2000 transmitting the setting change signal to the access control device 3000 (S840) may be performed.

The user's terminal 2000 may transmit, to the access control device 3000, the manager information and the setting change signal for changing the settings of the access control device 3000 according to the setting change information.

For example, the communication between the user's terminal 2000 and the access control device 3000 may be performed according to a short-range communication standard such as BLE, Bluetooth, NFC, and Wi-Fi.

Also, the user's terminal 2000 may not separately transmit the received manager information to the access control device 3000 but may transmit the setting change signal including the received manager information to the access control device 3000.

Also, the user's terminal 2000 may transmit the setting change signal and/or the manager information to the access control device 3000 when the distance between the user's terminal 2000 and the access control device 3000 is less than or equal to a certain distance.

Also, the user's terminal 2000 may transmit the setting change signal to the access control device 3000, and the access control device 3000 may transmit a positive acknowledgement signal (ACK) to the user's terminal 2000 when the setting change signal is successfully received. Also, the user's terminal 2000 may transmit the setting change signal to the access control device 3000, and the access control device 3000 may transmit a negative acknowledgement signal (NACK) when the setting change signal is not successfully received.

According to some embodiments of the present disclosure, the step of the access control device 3000 checking the manager information (S850) may be performed.

The access control device 3000 may receive manager information received by the user's terminal 2000 and compare the manager information to manager information prestored in the storage unit 3500 to determine whether the received manager information and the prestored manager information match. For example, the access control device 3000 may receive a manager password received by the user's terminal 2000 and compare the manager password to a manager password prestored in the storage unit 3500 to determine whether the received manager password and the prestored manager password match. When the manager information received by the user's terminal 2000 does not match the manager information prestored in the storage unit 3500, the access control device 3000 may not change the settings according to the setting change signal. In this case, the access control device 3000 may transmit a notification message indicating a manager information mismatch to the user's terminal 2000 or may output an alarm to the outside. When the manager information received by the user's terminal 2000 and the manager information prestored in the storage unit 3500 match each other, the access control device 3000 may change the settings according to the setting change signal. In this case, the access control device 3000 may transmit a notification message indicating a manager information match to the user's terminal 2000 or may output an alarm to the outside.

According to some embodiments of the present disclosure, the step of the access control device 3000 performing a setting change (S860) may be performed.

When the manager information received by the user's terminal 2000 and the manager information prestored in the storage unit 3500 match each other, the access control device 3000 may perform the setting change according to the setting change signal. For example, the access control device 3000 may perform the setting change corresponding to the setting change information through the control unit 3700. Also, the access control device 3000 may store information included in the setting change signal in the storage unit 3500 through the control unit 3700.

FIG. 17 is a flowchart of a method for storing biometric information acquired by a user's terminal 2000 in an access control device 3000 according to an embodiment of the present disclosure. The user's terminal 3000 may receive a user's biometric information, approaches the access control device 3000, and store the received biometric information in the access control device 3000.

Referring to FIG. 17, the method for storing biometric information acquired by a user's terminal 2000 in the access control device 3000 may include the user's terminal 2000 establishing a communication with the access control device 3000 (S900), the user's terminal 2000 acquiring biometric information (S910), the user's terminal 2000 receiving setting change information (S920), the user's terminal 2000 receiving manager information (S930), the user's terminal 2000 generating a setting change signal (S940), the user's terminal 2000 transmitting the setting change signal to the access control device 3000 (S950), the access control device 3000 checking the manager information (S960), and storing the biometric information in the access control device 3000 (S970).

According to some embodiments of the present disclosure, the step of the user's terminal 2000 establishing a communication with the access control device 3000 (S900) may be performed.

Step S900 is performed similarly to step S800, which has been described above, and thus a detailed description thereof will be omitted.

According to some embodiments of the present disclosure, the step of the user's terminal 2000 acquiring biometric information (S910) may be performed.

For example, the user's terminal 2000 may acquire biometric information to be stored in the access control device 3000 by receiving the biometric information from a user through the terminal biometric-information input unit 2700. When the terminal biometric-information input unit 2700 is a screen scanner for acquiring a user's fingerprint information, the user's terminal 2000 may receive and acquire the user's fingerprint information. Also, when the terminal biometric-information input unit 2700 is a microphone for acquiring a user's voice information, the user's terminal 2000 may receive and acquire the user's voice information. Also, when the terminal biometric-information input unit 2700 is a camera for acquiring a user's iris information, the user's terminal 2000 may receive and acquire the user's iris information.

As another example, the user's terminal 2000 may receive and acquire the biometric information to be stored in the access control device 3000 from the server 1000.

Also, the user's terminal 2000 may encrypt the acquired biometric information. For example, the user's terminal 2000 may encrypt the acquired biometric information with a public key of the access control device 3000.

According to some embodiments of the present disclosure, the step of the user's terminal 2000 receiving setting change information (S920) may be performed.

Also, the user's terminal 2000 may receive information necessary to store the biometric information in the access control device 3000. For example, the user's terminal 2000 may receive information necessary to determine which piece of biometric information is to be stored in the access control device 3000 from among the acquired biometric information.

According to some embodiments of the present disclosure, the step of the user's terminal 2000 receiving manager information (S930) may be performed.

Step S930 is performed similarly to step S820, which has been described above, and thus a detailed description thereof will be omitted.

According to some embodiments of the present disclosure, the step of the user's terminal 2000 generating a setting change signal (S940) may be performed.

The user's terminal 2000 may generate a setting change signal for storing the biometric information in the access control device 3000 on the basis of the acquired biometric information. Also, the user's terminal 2000 may generate a setting change signal including at least one of the received manager information and the acquired biometric information.

According to some embodiments of the present disclosure, the step of the user's terminal 2000 transmitting the setting change signal to the access control device 3000 (S950) may be performed.

The user's terminal 2000 may transmit, to the access control device 3000, the manager information and the setting change signal for changing the settings of the access control device 3000 according to the setting change information. Also, the user's terminal 2000 may separately transmit the acquired biometric information to the access control device 3000. For example, the communication between the user's terminal 2000 and the access control device 3000 may be performed according to a short-range communication standard such as BLE, Bluetooth, NFC, and Wi-Fi.

Also, the user's terminal 2000 may not transmit the received manager information and the acquired biometric information separately from the setting change signal but may transmit the setting change signal including at least one of the received manager information and the acquired biometric information to the access control device 3000.

Also, the user's terminal 2000 may transmit the setting change signal, the manager information, and/or the biometric information to the access control device 3000 when the distance between the user's terminal 2000 and the access control device 3000 is less than or equal to a certain distance.

Also, the user's terminal 2000 may transmit the setting change signal to the access control device 3000, and the access control device 3000 may transmit a positive acknowledgement signal (ACK) to the user's terminal 2000 when the setting change signal is successfully received. Also, the user's terminal 2000 may transmit the setting change signal to the access control device 3000, and the access control device 3000 may transmit a negative acknowledgement signal (NACK) when the setting change signal is not successfully received.

According to some embodiments of the present disclosure, the step of the access control device 3000 checking the manager information (S960) may be performed.

Step S960 is performed similarly to step S850, which has been described above, and thus a detailed description thereof will be omitted.

According to some embodiments of the present disclosure, the step of storing the biometric information in the access control device 3000 (S970) may be performed.

When the manager information received by the user's terminal 2000 and the manager information prestored in the storage unit 3500 match each other, the access control device 3000 may store the biometric information received from the user's terminal 2000 in the storage unit 3500.

In this case, when the received biometric information is encrypted, the access control device 3000 may decrypt the encrypted biometric information and store the decrypted biometric information in the storage unit 3500. For example, when the setting change signal including the biometric information encrypted with the public key of the access control device 3000 is received from the user's terminal 2000, the access control device 3000 may decrypt the biometric information with a private key of the access control device 3000 and store the biometric information in the storage unit 3500.

The method according to an embodiment may be implemented in the form of program instructions executable by a variety of computer means and may be recorded on a computer-readable medium. The computer-readable medium may include program instructions, data files, data structures, and the like alone or in combination. The program instructions recorded on the medium may be designed and configured specifically for an embodiment or may be publicly known and usable by those who are skilled in the field of computer software. Examples of the computer-readable recording medium include a magnetic medium, such as a hard disk, a floppy disk, and a magnetic tape, an optical medium, such as a compact disc read-only memory (CD-ROM), a digital versatile disc (DVD), etc., a magneto-optical medium such as a floptical disk, and a hardware device specially configured to store and perform program instructions, for example, a read-only memory (ROM), a random access memory (RAM), a flash memory, etc. Examples of the computer instructions include not only machine language code generated by a compiler, but also high-level language code executable by a computer using an interpreter or the like. The hardware device may be configured to operate as one or more software units in order to perform the steps of an embodiment, and vice versa.

According to an embodiment of the present disclosure, a user does not have to carry a separate authentication means because whether the user has an access right is determined through the user's terminal, and thus it is possible to increase user convenience.

Also, according to an embodiment of the present disclosure, information for performing access authentication does not need to be stored in a storage unit of the access control device and may be stored in a user's terminal or a server, and thus it is possible to increase the security of an access control system.

Also, according to an embodiment of the present disclosure, networking between an access control device and a server is not required because information regarding whether a door is accessed is transmitted to a server by a user's terminal, and thus it is possible to reduce related cost and effort.

Also, according to an embodiment of the present disclosure, a user's terminal directly changes the settings of an access control device without needing a procedure of changing the settings of the access control device through networking between the access control device and the server due to wiring work, and thus it is possible to reduce related cost and effort.

Also, according to an embodiment of the present disclosure, in the case of a door capable of being opened by pressing an opening switch, etc., when a user presses the switch to access the door, an access authentication request may be received. In this case, a user's terminal may perform access authentication and receive a defined message from a server. Thus, it is possible to effectively provide an advertisement or an information notification to a user.

Advantageous effects of the invention are not limited to the aforementioned effects, and other advantageous effects that are not described herein will be clearly understood by those skilled in the art from the following description and the accompanying drawings.

Although the present disclosure has been described with reference to specific embodiments and drawings, it will be appreciated that various modifications and changes can be made from the disclosure by those skilled in the art. For example, appropriate results may be achieved although the described techniques are performed in an order different from that described above and/or although the described components such as a system, a structure, a device, or a circuit are combined in a manner different from that described above and/or replaced or supplemented by other components or their equivalents.

Therefore, other implementations, embodiments, and equivalents are within the scope of the following claims.

What is claimed is:

1. An access control method performed by a terminal for confirmation of permission to enter first door corresponding to a first access control device, the method comprising:
   obtaining access right information from a server, wherein the access right information includes registered identification information, wherein the registered identification information includes identification information for the first access control device and second access control device corresponding to second door to which the terminal is accessible such that the access right information is used not only to determine the access right to the first door but also to determine the access right to the second door;
   detecting the first access control device;
   establishing a communication channel between the first access control device and the terminal;
   receiving identification information of the first access control device through the communication channel;
   performing first access authenticating operation,
   wherein the first access authenticating operation is performed by comparing the received identification information from the first access control device with the identification information of the first access control device and the second access control device included in the registered identification information of the access right information; and
   permitting the terminal to enter the first door when a predetermined condition is satisfied in the first access authenticating operation,
   wherein a validity period is set for the access right information independently of location of the terminal,
   wherein the access right information is expired when the validity period elapses, and
   wherein, the access right to the first door as well as the access right to the second door also expires, when the validity period expires.

2. The access control method of claim 1, further comprising,
   performing second access authenticating operation,
   wherein the registered identification information includes time information related to accessible time periods to enter the first door and the second door, and
   wherein the second access authenticating operation is performed based on current time and the time information.

3. The access control method of claim 2, further comprising,
   receiving a signal for requesting the first access authenticating operation and the second access authenticating operation from the first access control device.

4. The access control method of claim 3,
   wherein the communication channel is established in response to the signal for requesting the first access authenticating operation and the second access authenticating operation.

5. The access control method of claim 3,
   wherein the signal for requesting the first access authenticating operation and the second access authenticating operation is generated in response to an input signal from the first access control device for opening the first door.

6. The access control method of claim 5, further comprising,
   receiving a message from the server in response to the signal for requesting the first access authenticating operation and the second access authenticating operation.

7. The access control method of claim 6,
   wherein the received message is determined by the server based on the current time.

8. The access control method of claim 1,
   wherein the permitting the terminal to enter the first door when a predetermined condition is satisfied in the first access authenticating operation comprising:
   permitting the terminal to enter the first door when a predetermined condition is satisfied in the first access authenticating operation and the second access authenticating operation.

9. The access control method of claim 1,
   wherein the terminal is permitted to enter the first door when the identification information for the first access control device included in the received identification information is matched to one of the registered identification information, in the first access authenticating operation.

10. The access control method of claim 1, further comprising,
    obtaining biometric information from the terminal or the first access control device,
    wherein the access right information further includes registered biometric information, and
    wherein the second access authenticating operation is performed considering the registered biometric information and the obtained biometric information.

11. The access control method of claim 10,
    wherein the obtained biometric information includes at least one of voice information, fingerprint information, iris information, face information, and vein information.

12. The access control method of claim 1,
    wherein the registered identification information corresponds to registered user identification information or registered terminal identification information, and
    wherein the registered user identification information is related to users that are available to enter the first door and the registered terminal identification information is related to terminals that are accessible for permission to enter the first door.

13. The access control method of claim 1, wherein the first door is selected based on a distance between the first access control device and the terminal.

14. The access control method of claim 1, further comprising:
generating a control signal for controlling the first access control device to open the first door after the permitting.

15. The access control method of claim 1, further comprising,
generating result information related to whether or not the terminal is permitted to enter the first door.

16. The access control method of claim 15, further comprising,
transmitting the result information to the server.

17. A non-transitory computer-readable recording medium having a program recorded thereon for executing the method according to claim 1.

18. A first access control device corresponding to a first door, the first access control device comprising:
a communication unit configured to establish a communication channel between the first access control device and a terminal; and
a control unit configured to transmit, via the communication unit, identification information of the first access control device to the terminal for first access authenticating operation performed by the terminal based on access right information in the terminal;
wherein the access right information includes registered identification information, wherein the registered identification information includes identification information for the first access control device and second access control device corresponding to second door to which the terminal is accessible such that the access right information is used not only to determine the access right to the first door but also to determine the access right to the second door,
wherein the first access authenticating operation is performed by comparing the identification information of the first access control device with the identification information of first access control device and the second access control device included in the registered identification information of the access right information; and
wherein the terminal is configured to permit entering the first door when a predetermined condition is satisfied in the first access authenticating,
wherein a validity period is set for the access right information independently of location of the terminal,
wherein the access right information is expired when the validity period elapses, and
wherein, when the validity period expires, the access right to the first door as well as the access right to the second door also expires.

* * * * *